(12) United States Patent
Kim et al.

(10) Patent No.: US 11,171,512 B2
(45) Date of Patent: Nov. 9, 2021

(54) METHOD AND ELECTRONIC DEVICE FOR PERFORMING WIRELESS CHARGING

(71) Applicant: Samsung Electronics Co., Ltd., Suwon-si (KR)

(72) Inventors: Kyoung-Won Kim, Seoul (KR); Dong-Zo Kim, Yongin-si (KR); Se-Ho Park, Yongin-si (KR); Kwang-Seob Kim, Suwon-si (KR); Chang-Hak O, Suwon-si (KR); Ju-Hyang Lee, Suwon-si (KR); Hyung-Koo Chung, Suwon-si (KR); Se-Hyun Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 493 days.

(21) Appl. No.: 15/830,416

(22) Filed: Dec. 4, 2017

(65) Prior Publication Data

US 2018/0159371 A1  Jun. 7, 2018

(30) Foreign Application Priority Data

Dec. 5, 2016 (KR) .......................... 10-2016-0164644

(51) Int. Cl.
*H02J 50/10* (2016.01)
*H02J 7/02* (2016.01)
*H02J 50/80* (2016.01)
*H02J 50/12* (2016.01)

(52) U.S. Cl.
CPC ............. *H02J 50/10* (2016.02); *H02J 7/025* (2013.01); *H02J 50/12* (2016.02); *H02J 50/80* (2016.02)

(58) Field of Classification Search
CPC .. H02J 50/10; H02J 50/12; H02J 50/80; H02J 7/025; H02J 50/70
See application file for complete search history.

(56) References Cited

U.S. PATENT DOCUMENTS

| 8,519,667 | B2 * | 8/2013 | Tsai ........................ H02J 7/045 |
| | | | 320/108 |
| 10,075,025 | B2 * | 9/2018 | Ichikawa ................ H02J 5/005 |
| 2012/0175967 | A1 * | 7/2012 | Dibben ................. H02J 7/0029 |
| | | | 307/104 |

(Continued)

FOREIGN PATENT DOCUMENTS

KR  10-2015-0104382 A  9/2015

*Primary Examiner* — Jared Fureman
*Assistant Examiner* — Michael J Warmflash
(74) *Attorney, Agent, or Firm* — Jefferson IP Law, LLP

(57) ABSTRACT

A method and electronic device for performing wireless charging are provided. The electronic device includes a housing, a conductive coil, a power transmission circuit electrically connected to the conductive coil, and configured to wirelessly transmit power to an outside of the housing through the conductive coil, a voltage source electrically connected to the power transmission circuit, and a control circuit electrically connected between the power transmission circuit and the voltage source. The control circuit is configured to change power radiated through the conductive coil, monitor a frequency of a signal and/or electromagnetic waves radiated through the conductive coil, and adjust a level of a voltage from the voltage source based on at least a part of a monitored result of the frequency.

14 Claims, 16 Drawing Sheets

(56) References Cited

U.S. PATENT DOCUMENTS

| | | | | |
|---|---|---|---|---|
| 2012/0286724 A1* | 11/2012 | Tsai | ........................ | H02J 50/12 |
| | | | | 320/108 |
| 2016/0028248 A1* | 1/2016 | Asanuma | ................ | H02J 50/90 |
| | | | | 307/104 |
| 2016/0187519 A1* | 6/2016 | Widmer | .................... | G01V 3/10 |
| | | | | 324/222 |
| 2017/0368944 A1* | 12/2017 | Huang | .................. | B60L 53/126 |

* cited by examiner

H-FIELD: 50% DUTY CYCLE

TX COIL WAVEFORM WHEN INVERTER OUTPUT WAVEFORM HAS 50% DUTY CYCLE

TX COIL WAVEFORM WHEN INVERTER OUTPUT WAVEFORM HAS 30% DUTY CYCLE

METHOD AND ELECTRONIC DEVICE FOR PERFORMING WIRELESS CHARGING

CROSS-REFERENCE TO RELATED APPLICATION(S)

This application claims the benefit under 35 U.S.C. § 119(a) of a Korean patent application filed on Dec. 5, 2016 in the Korean Intellectual Property Office and assigned Serial number 10-2016-0164644, the entire disclosure of which is hereby incorporated by reference.

TECHNICAL FIELD

The present disclosure relates to a method and electronic device for performing wireless charging.

BACKGROUND

Wireless charging technology uses wireless power transmission and reception. The battery of an electronic device (for example, a smartphone) can be charged without being connected to a charging connector, through wireless charging.

A wireless power transmitter may transfer power to a wireless power receiver by at least one of inductive coupling based on electromagnetic induction produced by a wireless power signal, and electromagnetic resonance coupling based on electromagnetic resonance generated by a wireless power signal in a specific frequency.

In an electromagnetic induction-based wireless power transmission method, power is transmitted wirelessly by use of primary and secondary coils. A varying magnetic field generated from one coil by electromagnetic induction induces current to flow in the other coil, thus transferring power.

In an electromagnetic resonance coupling-based wireless power transmission method, electromagnetic resonance is generated in an electronic device by a wireless power signal transmitted by a wireless power transmitter, thereby transferring power from the wireless power transmitter to the electronic device.

Electromagnetic interference (EMI) may occur in the wireless power transmitter and the wireless power receiver. EMI may mean that electromagnetic waves directly radiated or conducted from one electronic device affect the functions of another electronic device. Along with the recent increase in the battery capacity of smartphones, an output circuit of a wireless power transmitter outputs large voltage and current signals for fast wireless charging, compared to general wireless charging. As a result, a very large noise signal may be generated in the output circuit of the wireless power transmitter. Moreover, other circuits may suffer from interference, thus causing system problems.

Electromagnetic induction-based wireless charging uses a frequency band ranging from 110 kHz to 190 kHz. Because transmission power is controlled by changing a power transmission frequency, a signal component having an invalid frequency may act as EMI noise. Although the wireless power transmission frequency may be changed in conformance to the EMI regulation policy, an available range of variable frequencies is set for the wireless power transmitter and thus wireless charging efficiency may be decreased.

Accordingly, there is a need for a method for effectively minimizing EMI in a high-power output circuit in a wireless power transmitter.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wireless power transmitter for effectively preventing electromagnetic interference (EMI) within an available frequency range in a wireless power transmitter.

Another aspect of the present disclosure is to provide a wireless power transmitter for preventing EMI, while increasing the variation width of transmission power, by controlling a power transmission frequency.

In accordance with an aspect of the present disclosure, an electronic device is provided. The electronic device includes a housing, a conductive coil, a power transmission circuit electrically connected to the conductive coil, and configured to wirelessly transmit power to an outside of the housing through the conductive coil, a voltage source electrically connected to the power transmission circuit, and a control circuit electrically connected between the power transmission circuit and the voltage source. The control circuit is configured to change power radiated through the conductive coil, monitor a frequency of a signal or electromagnetic waves radiated through the conductive coil, and adjust a level of a voltage from the voltage source based on at least a part of a monitored result of the frequency.

In accordance with another aspect of the present disclosure, a wireless charging method in an electronic device is provided. The wireless charging method includes wirelessly transmitting power through a coil, monitoring a transmission frequency of a signal to be radiated through the coil, and adjusting the transmission frequency by adjusting a power level based on a result of the monitoring.

In accordance with another aspect of the present disclosure, an electronic device is provided. The electronic device includes a housing, a conductive coil, a power transmission circuit electrically connected to the conductive coil, and configured to wirelessly transmit power to an outside of the housing through the conductive coil, a voltage source electrically connected to the power transmission circuit, and a control circuit electrically connected between the power transmission circuit and the voltage source, wherein the control circuit is configured to determine power radiated through the conductive coil, and adjust a level of a voltage from the voltage source, and determine a frequency of a signal or electromagnetic waves radiated through the conductive coil, according to the power that is radiated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
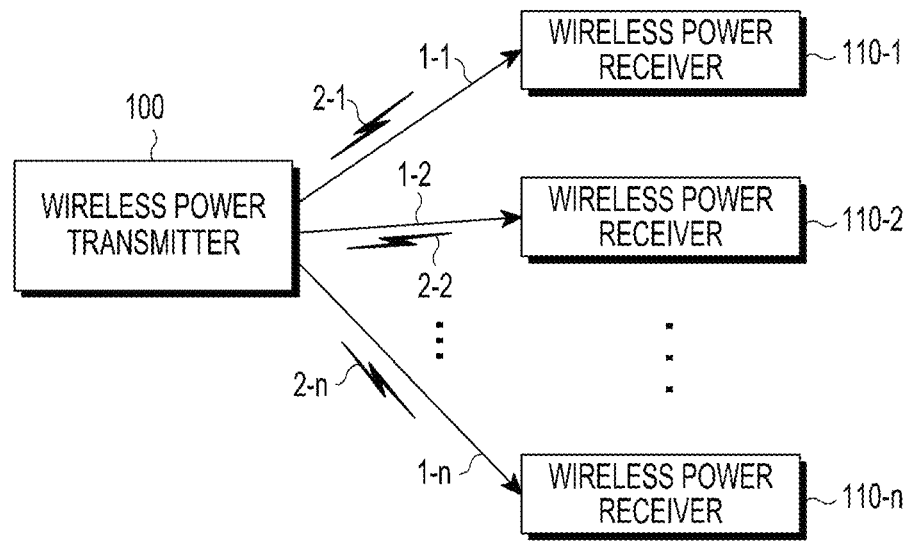
FIG. 1 is a conceptual view illustrating an overall operation of a wireless charging system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. For example, reference to "a component surface" includes reference to one or more of such surfaces.

In the present disclosure, the term 'have', 'may have', 'include', or 'may include' signifies the presence of a specific feature (for example, number, function, operation, or component such as part), not excluding the presence of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

The terms as used in the present disclosure are provided to describe merely specific embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

FIG. 1 is a conceptual view illustrating an overall operation of a wireless charging system according to an embodiment of the present disclosure.

Referring to FIG. 1, the wireless charging system may include a wireless power transmitter 100, and at least one wireless power receiver 110-1, 110-2, . . . , 110-n.

The wireless power transmitter 100 may wirelessly transmit power 1-1, 1-2, . . . , 1-n to the at least one wireless power receiver 110-1, 110-2, . . . , 110-n.

The wireless power transmitter may establish electrical connections to the wireless power receivers 110-1, 110-2, . . . , 110-n. For example, the wireless power transmitter 100 may transmit wireless power by radiating an electromagnetic field or a magnetic field. The wireless power transmitter 100 may transmit wireless power through induction coupling or electromagnetic resonance coupling.

The wireless power transmitter 100 may conduct bi-directional communication with the wireless power receivers 110-1, 110-2, . . . , 110-n.

A wireless power receiver may be configured, particularly as a small appliance such as a mobile communication terminal, a personal digital assistant (PDA), a portable multimedia player (PMP), a smartphone, a wearable electronic device, or a mobile music player, a large appliance such as a refrigerator or a television (TV), an electronic vehicle, and the like. The wireless power transmitter 100, which is an electronic device capable of charging a wireless power receiver such as a smartphone, may be configured as a charging pad, a stand-type wireless charger, a tray design wireless charger, and the like.

If out-of-band communication is adopted, the wireless power transmitter 100 and the wireless power receivers 110-1, 110-2, . . . , 110-n may process or transmit and receive packets 2-1, 2-2, . . . , 2-n each including specific frames. If in-band communication is adopted, the wireless power receivers 110-1, 110-2, . . . , 110-n may perform load modulation, and the wireless power transmitter 100 may acquire reports of the wireless power receivers 110-1, 110-2, . . . , 110-n by detecting load variations.

The wireless power transmitter 100 may supply power wirelessly to a plurality of wireless power receivers 110-1, 110-2, . . . , 110-n. For example, the wireless power transmitter 100 may transmit power to the plurality of wireless power receivers 110-1, 110-2, . . . , 110-n through electromagnetic resonance coupling. If the wireless power transmitter 100 uses electromagnetic resonance coupling, the wireless power transmitter 100 may be apart from the wireless power receivers 110-1, 110-2, . . . , 110-n by distances allowing operations in an indoor environment. If the wireless power transmitter 100 uses electromagnetic induction, the distances between the wireless power transmitter 100 and the wireless power receivers 110-1, 110-2, . . . , 110-n may be preferably 10 cm or less. If the wireless power transmitter 100 uses radio frequency (RF)/microwave radiation, the wireless power transmitter 100 may generate directional microwave power beams and charge at least one of the wireless power receivers 110-1, 110-2, . . . , 110-n with the microwave power beams.

The wireless power receivers 110-1, 110-2, . . . , 110-n may receive wireless power from the wireless power transmitter 100 and charge their internal batteries with the received wireless power. Further, the wireless power receivers 110-1, 110-2, . . . , 110-n may transmit, to the wireless power transmitter 100, state information about the wireless power receivers 110-1, 110-2, . . . , 110-n, control information for the wireless power transmitter 100, and the like.

The wireless power receivers 110-1, 110-2, . . . , 110-n may transmit messages indicating their charged states to the wireless power transmitter 100 by in-band communication or out-of-band communication.

The wireless power transmitter 100 may include a display means such as a display, and display the state of each of the wireless power receivers 110-1, 110-2, . . . , 110-n based on a message received from each of the wireless power receivers 110-1, 110-2, . . . , 110-n. In addition, the wireless power transmitter 100 may display an expected time to completed charging of each of the wireless power receivers 110-1, 110-2, . . . , 110-n.

Figure 2:
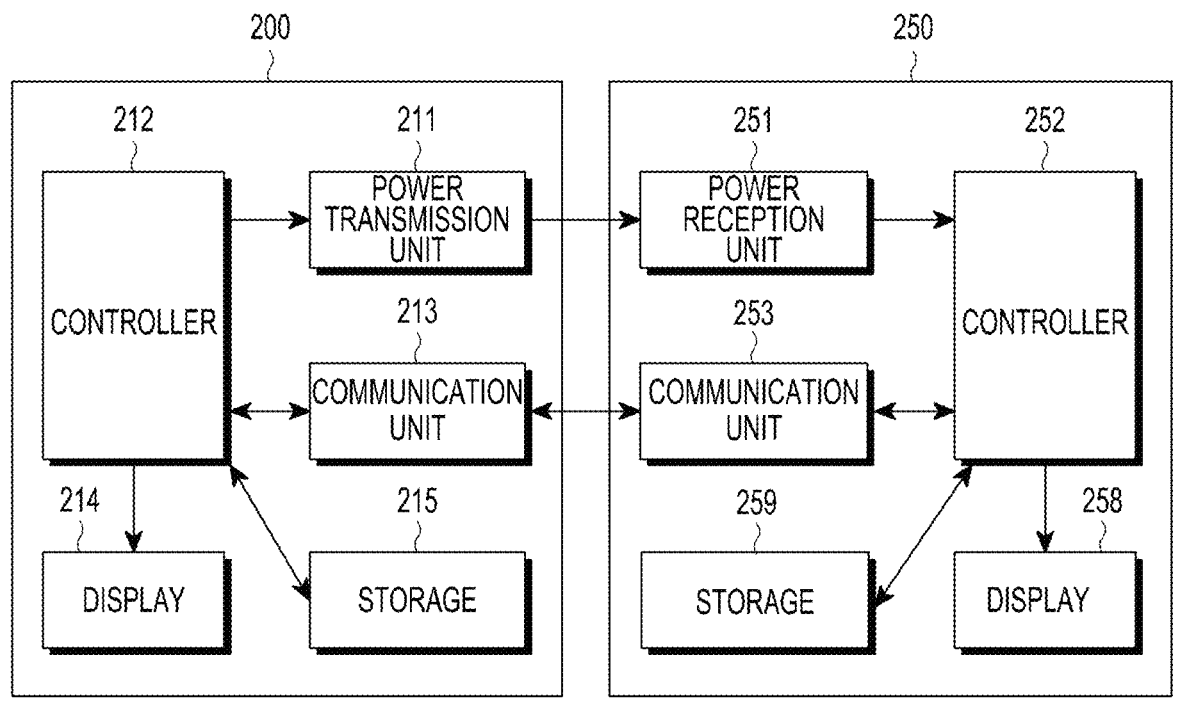
FIG. 2 is a block diagram of a wireless power transmitter and a wireless power receiver according to various embodiments of the present disclosure.

FIG. 2 is a block diagram of a wireless power transmitter and a wireless power receiver according to various embodiments of the present disclosure.

Referring to FIG. 2, a wireless power transmitter 200 according to an embodiment may include at least one of a power transmission unit 211, a controller 212, a communication unit 213, a display 214, or a storage 215.

The power transmission unit 211 may supply power requested by the wireless power transmitter 200, and supply power wirelessly to a wireless power receiver 250. The power transmission unit 211 may supply power in an alternating current (AC) waveform. The power transmission unit 211 may convert power of a direct current (DC) waveform to power of the AC waveform by means of an inverter, and thus supply the power of the AC waveform. The power transmission unit 211 may be configured as a built-in battery, or as a power reception interface which receives external power and supplies the received power to other components. Those skilled in the art will readily understand that as far as it is capable of supplying power in the AC waveform, any means is available as the power transmission unit 211.

The controller 212 may provide overall control of operations of the wireless power transmitter 200. For example, the controller 212 may control the overall operations of the wireless power transmitter 200 by an algorithm, program, or application required for control, read from the storage 215. The controller 212 may be implemented as a CPU, a microprocessor, or a mini computer. Accordingly, the controller 212 may be referred to as a controller, or depending on implementation, as a micro controlling unit (MCU).

The communication unit 213 may communicate with the wireless power receiver 250 in a predetermined communication scheme. The communication unit 213 may receive power information from the wireless power receiver 250. For example, the power information may include at least one of the capacity, residual battery amount, charging count, used amount, battery capacity, or battery rate of the wireless power receiver 250.

Further, the communication unit 213 may transmit a charging function control signal for controlling the charging function of the wireless power receiver 250. The wireless function control signal may be a control signal that enables or disables the charging function by controlling a power reception unit 251 of the specific wireless power receiver 250.

The communication unit 213 may receive a signal from another wireless power transmitter (not shown) as well as the wireless power receiver 250.

The controller 212 may display, on the display 214, the state of the wireless power receiver 250 based on a message received from the wireless power receiver 250 through the communication unit 213. The controller 212 may also display, on the display 214, an expected time to completion of charging the wireless power receiver 250.

Referring to FIG. 2, the wireless power receiver 250 according to an embodiment may include at least one of the power reception unit 251, a controller 252, a communication unit 253, a display 258, or a storage 259.

The power reception unit 251 may receive power wirelessly from the wireless power transmitter 200. The power reception unit 251 may receive power in the AC waveform.

The controller 252 may provide overall control of operations of the wireless power receiver 250. For example, the controller 252 may control the overall operations of the wireless power receiver 250 by an algorithm, program, or application required for control, read from the storage 259. The controller 252 may be implemented as a CPU, a microprocessor, or a mini computer.

The communication unit 253 may communicate with the wireless power transmitter 200 in a predetermined communication scheme. The communication unit 253 may transmit power information to the wireless power transmitter 200. For example, the power information may include at least one of the capacity, residual battery amount, charging count, used amount, battery capacity, or battery rate of the wireless power receiver 250.

Further, the communication unit 253 may receive a charging function control signal for controlling the charging function of the wireless power receiver 250. The wireless function control signal may be a control signal that enables or disables the charging function by controlling the power reception unit 251 of the specific wireless power receiver 250. The controller 252 may display, on the display 258, the state of the wireless power receiver 250. The controller 212 may also display, on the display 258, an expected time to completion of charging the wireless power receiver 250.

Figure 3:
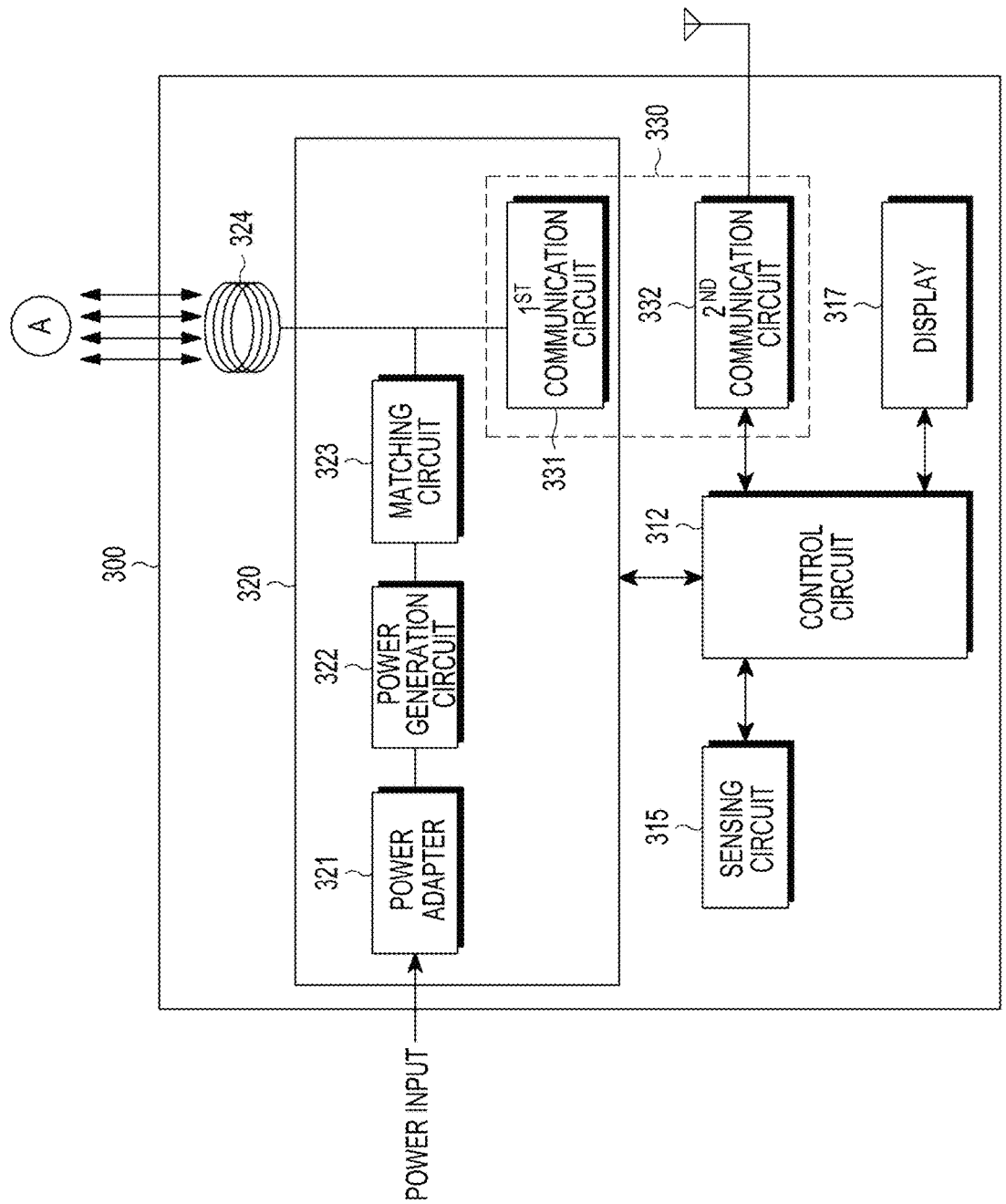
FIG. 3 is a detailed block diagram of a wireless power transmission apparatus in a wireless charging system according to various embodiments of the present disclosure.

FIG. 3 is a detailed block diagram of a wireless power transmission apparatus in a wireless charging system according to various embodiments of the present disclosure.

Figure 4:
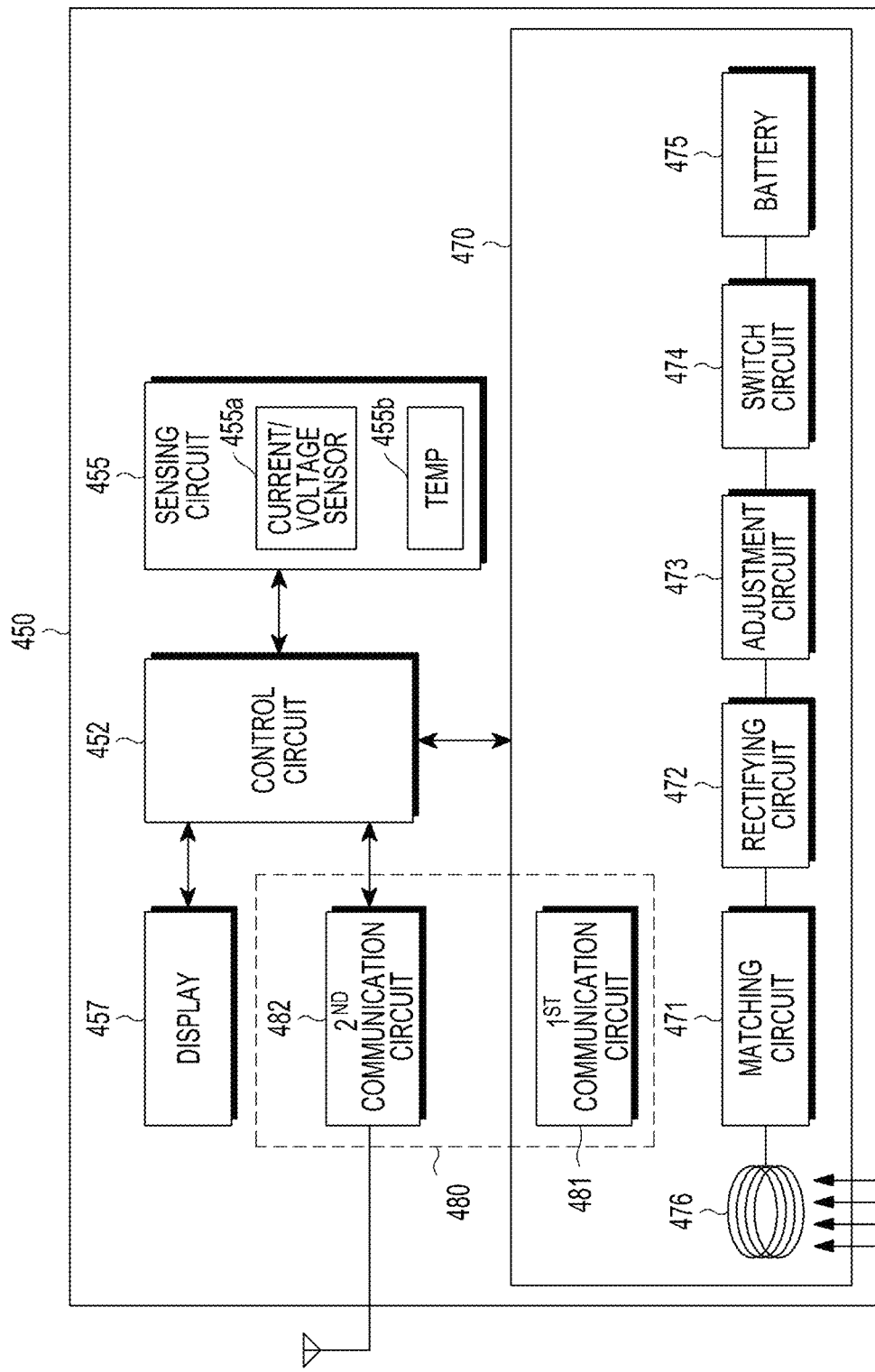
FIG. 4 is a detailed block diagram of a wireless power reception apparatus in a wireless charging system according to various embodiments of the present disclosure.

FIG. 4 is a detailed block diagram of a wireless power reception apparatus in a wireless charging system according to various embodiments of the present disclosure.

Referring to FIG. 3, a wireless power transmission apparatus 300 (for example, the wireless power transmitter 200) according to an embodiment of the present disclosure may include a housing (not shown), at least one conductive pattern 324 (for example, a conductive coil and an inductive coil), and a power transmission circuit 320 which is electrically connected to the conductive pattern 324 and configured to transmit power wirelessly to the outside of the housing through the conductive pattern 324.

The wireless power transmission apparatus 300 may include at least a part of the power transmission circuit 320, a control circuit 312 (for example, an MCU, a controller, or a processor), a communication circuit 330 (for example, an out-of-band signaling circuit), a sensing circuit 315, or a display 317.

Referring to FIG. 4, a wireless power reception apparatus 450 (for example, the wireless power receiver 250) according to an embodiment may include at least a part of a power reception circuit 470, a control circuit 452, a communication circuit 480, a sensing circuit 455, or a display 457.

Referring to FIGS. 3 and 4 according to an embodiment of the present disclosure, the power transmission circuit 320 may supply power to the wireless power reception apparatus 450. The power transmission circuit 320 may include a power adapter 321, a power generation circuit 322, a matching circuit 323, or a first communication circuit 331. The power transmission circuit 320 may also be configured to include at least one conductive pattern (for example, coil) 324. The power transmission circuit 320 may be configured to transmit power wirelessly to the wireless power reception apparatus 450 through the conductive pattern 324. The power transmission circuit 320 may receive power in the DC or AC waveform from the outside, and supply the received power in the AC waveform to the wireless power reception apparatus 450.

The power adapter 321 may receive AC or DC power from the outside (for example, a voltage source), or may receive a power signal of a battery device and output the received power signal as DC power having a predetermined voltage value. The voltage source may be electrically connected to the power transmission circuit 320, and supply power to the power adapter 321. The voltage value of DC power output from the power adapter 321 may be controlled by the control circuit 312. The power adapter 321 may output the DC power to the power generation circuit 322.

The power generation circuit 322 may convert DC received from the power adapter 321 to AC, and output the AC. The power generation circuit 322 may include a predetermined amplifier (not shown). If the DC received through the power adapter 321 is smaller than a predetermined gain, the DC may be amplified to the predetermined gain through the amplifier. Or the power generation circuit 322 may include a circuit for converting DC received from the power adapter 321 to AC based on a control signal received from the control circuit 312. For example, the power generation circuit 322 may convert the DC to the AC through a predetermined inverter. Or the power generation circuit 322 may include a gate driver (not shown). The gate driver may convert the DC to the AC by controlling on/off of the DC. Or the power generation circuit 322 may generate an AC power signal through a wireless power generator (for example, an oscillator).

The matching circuit 323 may perform impedance matching. For example, when the AC signal output from the power generation circuit 322 is provided to the conductive pattern 324, the AC signal may generate an electromagnetic field in the conductive pattern 324. The frequency band of the generated electromagnetic field signal may be adjusted by adjusting the impedance of the matching circuit 323.

The matching circuit 323 may control output power transmitted to the wireless power reception apparatus 450 through the conductive pattern 324 to be highly efficient or high power by impedance adjustment. The matching circuit 323 may adjust impedance under the control of the control circuit 312. The matching circuit 323 may include at least one of an inductor (for example, coil), a capacitor, or a switch device. The control circuit 312 may control connection to at least one of the inductor and the capacitor through the switch device, thereby performing impedance matching.

When current is applied to the conductive pattern 324, the conductive pattern 324 may form a magnetic field for inducting current to the wireless power reception apparatus 450. The first communication circuit 331 (for example, a resonant circuit) may conduct communication (for example, data communication) in an in-band manner using electromagnetic waves generated by the conductive pattern 324.

The sensing circuit 315 may sense a variation in current/voltage applied to the conductive pattern 324 of the power transmission circuit 320. According to an embodiment, the sensing circuit 315 may be omitted, and the control circuit 312 may take charge of a sensing operation. The wireless power transmission apparatus 300 may change the amount of the power to be transmitted according to the variation of the current/voltage applied to the conductive pattern 324. Or the sensing circuit 315 may sense a temperature change of the wireless power transmission apparatus 300. According to an embodiment, the sensing circuit 315 may include at least one of a current/voltage sensor and a temperature sensor.

The control circuit 312 may control wireless power transmission to the wireless power reception apparatus 450 through the power transmission circuit 320. The control circuit 312 may control wireless information reception from the wireless power reception apparatus 450 through the communication circuit 330.

According to an embodiment, the received information may include at least one of charging configuration information related to the battery state of the wireless power reception apparatus 450, power amount control information related to control of the amount of power transmitted to the wireless power reception apparatus 450, environment information related to the charging environment of the wireless power reception apparatus 450, and time information about the wireless power reception apparatus 450.

The charging configuration information may be related to the battery state of the wireless power reception apparatus 450 at a time instant for wireless charging between the wireless power transmission apparatus 300 and the wireless power reception apparatus 450. For example, the charging configuration information may include at least one of a total battery capacity, residual battery amount, used battery amount, charging mode, charging scheme, or wireless reception frequency band of the wireless power reception apparatus 450.

The power amount control information may be information for controlling the amount of the transmitted initial power according to a variation in the amount of power with which the wireless power reception apparatus 450 has been charged during wireless charging between the wireless power transmission apparatus 300 and the wireless power reception apparatus 450.

The environment information is information obtained by measuring the charging environment of the wireless power reception apparatus 450 by the sensing circuit 455 of the wireless power reception apparatus 450. For example, the environment information may include at least one of temperature data including at least one of internal temperature data and ambient temperature data of the wireless power reception apparatus 450, illuminance data representing the ambient illuminance (brightness) of the wireless power reception apparatus 450, and sound data representing the ambient sound (noise) of the wireless power reception apparatus 450.

The control circuit 312 may control generation or transmission of power to be transmitted to the wireless power reception apparatus 450 based on the charging configuration information among the received information. The control circuit 312 may determine or change the amount of power to be transmitted to the wireless power reception apparatus 450 based on at least part of the received information (for example, at least one of the power amount control information, the environment information, and the time information). The control circuit 312 may control the matching circuit 323 to change impedance.

The display 317 (for example, a user interface) may display overall information related to the state, environment information, or charged state of the wireless power transmission apparatus 300.

The communication circuit 330 may communicate with the of the wireless power reception apparatus 450 in a predetermined communication scheme. The communication circuit 330 may conduct data communication with the communication circuit 480 of the wireless power reception apparatus 450. For example, the communication circuit 330 may unicast, multicast, or broadcast the signal.

According to an embodiment, the communication circuit 330 may include at least one of a first communication circuit 331 which is configured with the power transmission circuit 320 into one hardware unit and enables in-band communication of the wireless power transmission apparatus 300, or a second communication circuit 332 which is configured as a hardware unit separate from the power transmission circuit 320 and enables out-of-band communication of the wireless power transmission apparatus 300.

According to an embodiment, if the communication circuit 330 includes the first communication circuit 331 capable of in-band communication, the first communication circuit 331 may receive the frequency and signal level of an electromagnetic field signal received through the conductive pattern 324 of the power transmission circuit 320. The control circuit 312 may extract information received from the wireless power reception apparatus 450 by decoding the received frequency and signal level of the electromagnetic signal. Or the first communication circuit 331 may apply a signal of information about the wireless power transmission apparatus 300 to be transmitted to the wireless power reception apparatus 450 to the conductive pattern 324 of the power transmission circuit 320, or may add the signal of the information about the wireless power transmission apparatus 300 to an electromagnetic field signal generated by applying a signal output from the matching circuit 323 to the conductive pattern 324 and transmit the resulting signal to the wireless power reception apparatus 450. The control circuit 312 may control signal output by changing the state of a connection to at least one of the inductor and the capacitor of the matching circuit 323 by controlling on/off of the switch device included in the matching circuit 323.

According to an embodiment, if the communication circuit 330 includes the second communication circuit 332 capable of out-of-band communication, the second communication circuit 332 may communicate with the communication circuit 480 (for example, a second communication circuit 482) of the wireless power reception apparatus 450 by near field communication (NFC), Zigbee communication, infrared communication, visible ray communication, Bluetooth communication, Bluetooth low energy (BLE), and the like.

The above communication scheme of the communication circuit 330 is a mere example, and thus the various embodiments of the present disclosure are not limited to a specific communication scheme performed in the communication circuit 330.

According to an embodiment of the present disclosure, as illustrated in FIG. 4, the wireless power reception apparatus 450 may include the power reception circuit 470, the control circuit 452, the communication circuit 480, the sensing circuit 455, or the display 457. The power reception circuit 470 of the wireless power reception apparatus 450 may receive power from the power transmission circuit 320 of the wireless power transmission apparatus 300. The power reception circuit 470 may be configured as a built-in battery, or a power reception interface through which power is received from the outside. The power reception circuit 470 may include a matching circuit 471, a rectifying circuit 472, an adjustment circuit 473, a switch circuit 474, a battery 475, or at least one conductive pattern 476.

The power reception circuit 470 may receive wireless power in the form of electromagnetic waves generated in response to a current/voltage applied to the conductive pattern 324 of the power transmission circuit 320, through the conductive pattern 476. For example, the power reception circuit 470 may receive power, using induced electromotive force generated in the conductive pattern 324 of the power transmission circuit 320 and the conductive pattern 476 of the power reception circuit 470.

The matching circuit 471 may perform impedance matching. For example, as power transmitted through the conductive pattern 324 of the wireless power transmission apparatus 300 is transferred to the conductive pattern 476, an electromagnetic field may be formed. The matching circuit 471 may adjust the frequency band of the generated electromagnetic field signal by adjusting impedance. The matching circuit 471 may control input power received from the wireless power transmission apparatus 300 through the conductive pattern 476 to be highly efficient and high power by the impedance adjustment. The matching circuit 471 may adjust impedance under the control of the control circuit 452. The matching circuit 471 may include at least one of an inductor (for example, a coil), a capacitor, and a switch device. The control circuit 452 may control the state of a connection to at least one of the inductor and the capacitor through the switch device and thus perform impedance matching.

The rectifying circuit 472 may rectify wireless power received in the conductive pattern 476 to a DC form, and may be configured as, for example, a bridge diode.

The adjustment circuit 473 may convert the rectified power to a predetermined gain. The adjustment circuit 473 may include a DC-to-DC converter (not shown). For example, the adjustment circuit 473 may convert the rectified power so that a voltage at its output end may be 5V. Or a minimum or maximum value for a voltage that may be applied to the front end of the adjustment circuit 473 may be set.

The switch circuit 474 may connect the adjustment circuit 473 to the battery 475. The switch circuit 474 may be kept on or off under the control of the control circuit 452.

The battery 475 may be charged with power received from the adjustment circuit 473.

The sensing circuit 455 may sense a variation in the state of power received by the wireless power reception apparatus 450. For example, the sensing circuit 455 may measure a current/voltage value received at the conductive pattern 476 through a predetermined current/voltage sensor 455*a*, periodically or aperiodically. The wireless power reception apparatus 450 may calculate the amount of its received power based on the measured current/voltage.

According to an embodiment, the sensing circuit 455 may sense a change in the charging environment of the wireless power reception apparatus 450. For example, the sensing circuit 455 may periodically or aperiodically measure at least one of an internal temperature and an ambient temperature of the wireless power reception apparatus 450 through a specific temperature sensor 455*b*.

The display 457 (for example, a user interface) may display overall information related to the charged state of the wireless power reception apparatus 450. For example, the display 457 may display at least one of the total battery capacity, residual battery amount, charged battery amount, used battery amount, and an expected time to charging of the wireless power reception apparatus 450.

The communication circuit 480 may communicate with the wireless power transmission apparatus 300 in a predetermined communication scheme. The communication circuit 480 may conduct data communication with the communication circuit 330 of the wireless power transmission apparatus 300. The communication circuit 480 may operate in the same or similar manner as or to the communication circuit 330 of the wireless power transmission apparatus 300. The communication circuit 480 may include a first communication circuit 481.

The control circuit 452 may transmit charging configuration information for reception of a required amount of power based on information about the battery state of the wireless power reception apparatus 450 to the wireless power transmission apparatus 300 through the communication circuit 480. For example, once the control circuit 452 identifies the wireless power transmission apparatus 300 capable of transmitting wireless power, the control circuit 452 may transmit charging configuration information for reception of a required amount of power to the wireless power transmission apparatus 300 through the communication circuit 480, based on at least one of the total battery capacity, residual battery amount, charging count, used battery amount, charging mode, charging scheme, or wireless reception frequency band of the wireless power reception apparatus 450.

The control circuit 452 may transmit the power amount control information to the wireless power transmission apparatus 300 through the communication circuit 480 in order to control the amount of power received from the wireless power transmission apparatus 300 according to a change in the amount of power charged in the wireless power reception apparatus 450.

The control circuit 452 may transmit the environment information based on a change in the charging environment of the wireless power reception apparatus 450 to the wireless power transmission apparatus 300. For example, if a temperature data value measured by the sensing circuit 455 is greater than or equal to a predetermined temperature threshold, the control circuit 452 may transmit the measured temperature data to the wireless power transmission apparatus 300.

While the wireless power transmission apparatus 300 and the wireless power reception apparatus 450 according to the embodiment of the present disclosure are shown in FIGS. 3 and 4 as including only the power transmission circuit 420 and the power reception circuit 470, respectively, each of the wireless power transmission apparatus 300 and the wireless power reception apparatus 450 may include both the power transmission circuit 320 and the power reception circuit 470. Accordingly, the wireless power transmission apparatus 300 and the wireless power reception apparatus 450 according to the embodiment of the present disclosure may perform all of the functions of a power transmitter and a power receiver.

According to an embodiment, an electronic device (for example, the wireless power transmission apparatus 300) may include a housing, a conductive coil (for example, the conductive pattern 324), a power transmission circuit (for example, the power transmission circuit 320) electrically connected to the conductive coil, and configured to wirelessly transmit power to the outside of the housing through the conductive coil, a voltage source electrically connected to the power transmission circuit, and a control circuit (for example, the control circuit 312) electrically connected between the power transmission circuit and the voltage source. The control circuit may be configured to change power to be radiated through the conductive coil, monitor a frequency of a signal and/or electromagnetic waves radiated through the conductive coil, and adjust a level of a voltage from the voltage source based on at least a part of a monitored result of the frequency.

According to an embodiment, the control circuit may include a switch (for example, a switching module 720 of FIG. 7) electrically connected between the power transmission circuit and the voltage source, and may be configured to adjust the switch to adjust the level of the voltage from the voltage source.

According to an embodiment, the control circuit may be configured to decrease the power from a first power level to a second power level less than the first power level, monitor the frequency of the signal and/or the electromagnetic waves, determine whether the frequency is greater than or equal to a first threshold, and decrease the level of the voltage from the voltage source, if the frequency is greater than or equal to the first threshold.

According to an embodiment, the control circuit may be configured to increase the power from a third power level to a fourth power level greater than the third power level, monitor the frequency of the signal and/or the electromagnetic waves, determine whether the frequency is less than or equal to the first threshold, and increase the level of the voltage from the voltage source, if the frequency is less than or equal to the first threshold.

According to an embodiment, the control circuit may be configured to decrease the power from a first power level to a second power level less than the first power level, monitor the frequency of the signal and/or the electromagnetic waves shortly after or substantially simultaneously with the power decrease, determine whether the frequency is less than or equal to a first threshold, further decrease the power from the second power level to a third power level less than the second power level based on a determination that the frequency is less than the first threshold, monitor the frequency of the signal and/or the electromagnetic waves shortly after or substantially simultaneously with the power decrease to the third power level, and decrease the level of the voltage from the voltage source, if the frequency is greater than or equal to the first threshold.

According to an embodiment, the control circuit may be configured to decrease the power from a first power level to a second power level less than the first power level, monitor the frequency of the signal and/or the electromagnetic waves shortly after or substantially simultaneously with the power decrease, determine whether the frequency is greater than or equal to a first threshold, decrease the level of the voltage from the voltage source, further decrease the power from the second power level to a third power level less than the second power level, monitor the frequency of the signal and/or the electromagnetic waves shortly after or substantially simultaneously with the power decrease to the third power level, and further decrease the level of the voltage from the voltage source, if the frequency is greater than or equal to the first threshold.

According to an embodiment, the control circuit may be configured to determine whether the frequency of the signal and/or the electromagnetic waves is greater than or equal to a first threshold.

According to an embodiment, the first threshold may be a value between 130 kHz and 170 kHz.

According to an embodiment, the first threshold may be a value a value between 140 kHz and 160 kHz.

According to an embodiment, the first threshold may be a value between 145 Hz and 155 kHz.

According to an embodiment, the control circuit and/or the power transmission circuit may be configured to change the power radiated through the power transmission circuit to perform at least one of adjusting a duty cycle of the signal and/or the electromagnetic waves radiated through the conductive coil, or adjusting a duty of the signal and/or the electromagnetic waves radiated through the conductive coil.

According to an embodiment, the switch may be a DC-to-DC converter for adjusting the level of the voltage from the voltage source and outputting the voltage at the adjusted level.

According to an embodiment, the electronic device may further include a lumped inductor. According to an embodiment, the electronic device may further include a capacitor having one end connected to an inverter for inverting power of a DC waveform to power of an AC waveform, and the other end connected to the lumped inductor.

According to an embodiment, the switch may have one end connected between the capacitor and the lumped inductor, and the other end connected to the inverter, and output a voltage level adjusted based on the monitored result to the inverter.

According to an embodiment, the control circuit and/or the power transmission circuit may be configured to change the power to be radiated through the conductive coil by performing at least one operation, and the at least one operation may include adjusting a duty cycle of the signal and/or the electromagnetic waves radiated through the conductive coil.

Figure 5:
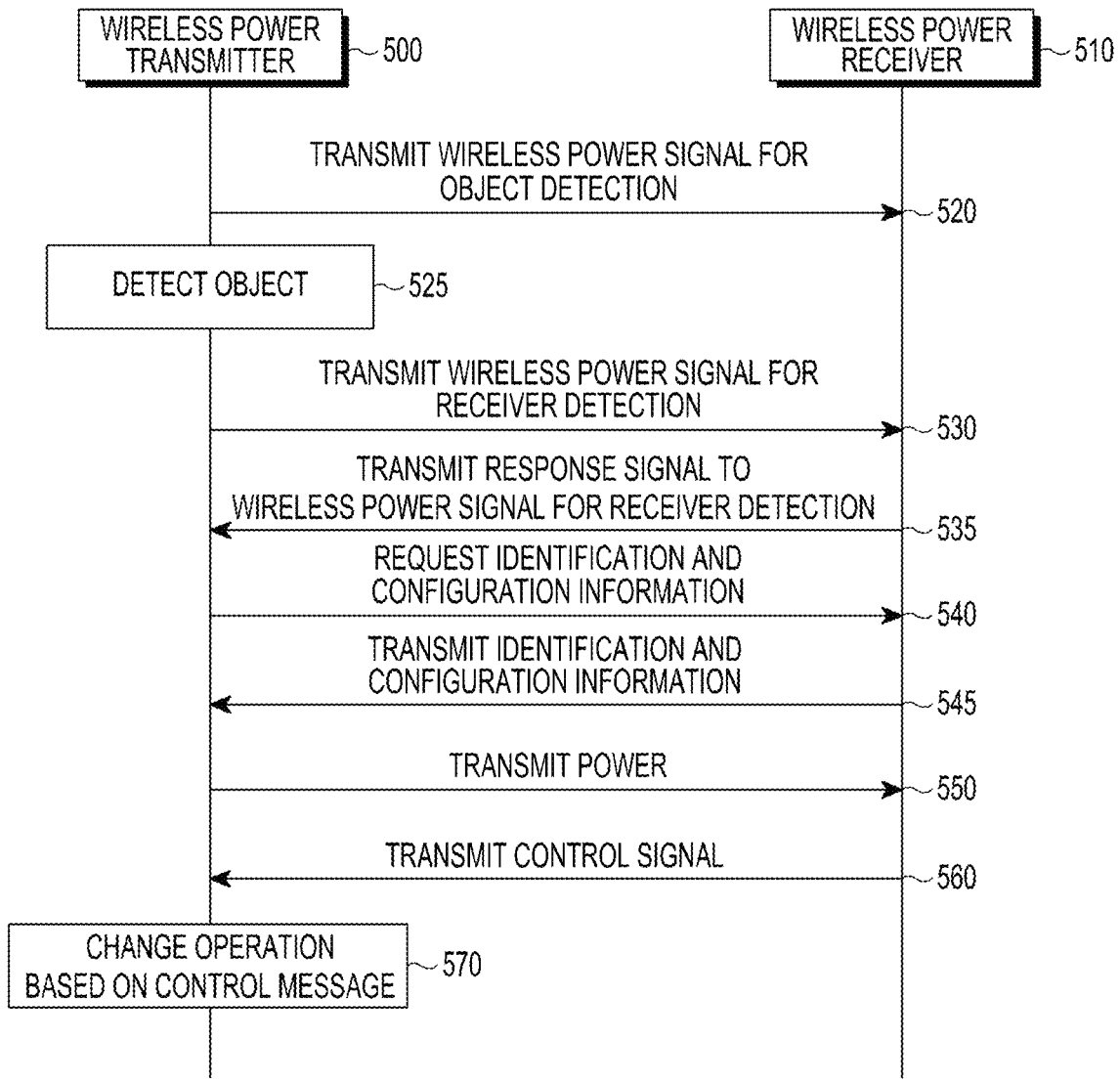
FIG. 5 is a diagram illustrating a signal flow for operations of a wireless power transmitter and a wireless power receiver in a wireless charging system according to various embodiments of the present disclosure.

FIG. 5 illustrates operations of a wireless power transmitter and operations of a wireless power receiver) in a wireless charging system according to an embodiment of the present disclosure.

Referring to FIG. 5, at least a part of operation 520 to operation 570 may be omitted. For example, if unidirectional communication is conducted in the wireless charging system 100, operation 540 may not be performed. A wireless power transmitter 500 may include at least a part of the components of the wireless power transmission apparatus 300 illustrated in FIG. 3 (for example, the power transmission circuit 320, the sensing circuit 315, the control circuit 312, the display 317, or the communication circuit 330). A wireless power receiver 510 may include at least a part of the components of the wireless power reception apparatus 450 illustrated in FIG. 4 (for example, the power reception circuit 470, the sensing circuit 455, the control circuit 452, the display 457, or the communication circuit 480).

In operation 520, the wireless power transmitter 500 may determine whether there is any object (for example, the wireless power receiver 510, a key, or a coin) within a sensing area. The sensing area may be an area in which an object may affect power transmission of the wireless power transmitter 500. For example, the sensing area may be an interface surface of the wireless power transmitter in the case of inductive coupling, and an area within a power transfer range in the case of electromagnetic resonance coupling. For example, the wireless power transmitter 500 may determine where there is an object within a predetermined range by sensing a change in the amount of power, generated in a power transmission circuit (for example, the power transmission circuit 320). For example, the wireless power transmitter 500 may identify an object by sensing a change in at least one of the frequency, current, or voltage of the power transmission circuit (for example, the power transmission circuit 320). The wireless power transmitter 500 may, for example, identify objects (for example, a key or a coin) incapable of wireless power reception, among objects within the sensing area.

For example, in the case of power transmission by inductive coupling, the wireless power transmitter 500 may sense the position of the wireless power receiver 510 placed on the interface surface of the wireless power transmitter 500. For example, the wireless power transmitter may sense the position of the wireless power receiver 510 by applying current to the power transmission circuit (for example, the power transmission circuit 320), and measuring the impedance of a conductive pattern, for example, the conductive pattern 424) through a sensing circuit (for example, the sensing circuit 315). If a predetermined time has elapsed or the wireless power transmitter 500 has failed in sensing the wireless power receiver 510 during a predetermined number of repeated searches, the wireless power transmitter 500 may not perform operation 530 until before an object placed on the interface surface is removed.

In operation 530, according to an embodiment, the wireless power transmitter 500 may transmit, to the wireless power receiver 510 as a reception apparatus, a wireless power signal for detecting the wireless power receiver 510. For example, the wireless power signal may include power for activating the wireless power receiver 510 or at least one component included in the wireless power receiver 510. The wireless power signal may be, for example, a signal generated by applying a power signal of a selected operating point for a selected time. The operating system may be defined by the frequency, duty cycle, or amplitude of a voltage applied to the power transmission circuit 320.

In operation 535, the wireless power receiver 510 may transmit a response signal for a search signal of operation 530 to the wireless power transmitter 500. For example, the wireless power receiver 510 may transmit the strength of the power signal or a power transfer complete signal in response to the search signal to the wireless power transmitter 500. The strength of the power signal may represent the degree of inductive coupling or electromagnetic resonance coupling for power transmission between the wireless power transmitter 500 and the wireless power receiver 510. For example, if power received by the wireless power receiver 510 is low with respect to power transmitted by the wireless power transmitter 500, the wireless power receiver 510 may determine that the coupling degree is low. For example, if there is no response to a power signal transmitted to the outside, the wireless power transmitter 500 may determine that it has failed in detecting the wireless power receiver 510. For example, if the wireless power transmitter 500 has not discovered the wireless power receiver 510 to which it may transmit power, the wireless power transmitter 500 may perform operation 520 again.

In operation 540, the wireless power transmitter 500 may request identification information and/or wireless charging-related configuration information about the wireless power receiver 510. For example, the identification information may include version information, a manufacture code, or a basic device identifier (ID). The configuration information may include, for example, a wireless charging frequency, a maximum chargeable power, a required power amount for charging, or an average transmission power amount.

In operation 545, the wireless power receiver 510 may transmit the identification information and/or the configuration information to the wireless power transmitter 500. The wireless power transmitter 500 may generate a power transfer contract with the wireless power receiver 510 based on at least a part of the received identification information and/or the configuration information, for use in power charging.

For example, the power transfer contract may include limits of parameters that determine power transfer characteristics in a power transfer state. The limits may include version information about the power transfer contract, identification information about the wireless power receiver 510 or a manufacturer, a power class, expected maximum power information, an option configuration, time information for an average reception power, or a method for determining current of an important cell of the wireless power transmitter 500.

In operation 550, the wireless power transmitter 500 may transmit power to the wireless power receiver 510. For example, the wireless power transmitter 500 may transmit power to the wireless power receiver 510 based on the power transfer contract. For example, if it turns out as a result of monitoring the parameters in the power transfer contract that power transmission to the wireless power receiver 510 breaches the limits included in the power transfer contract, the wireless power transmitter 500 may cancel the power transmission and perform operation 520 again. The wireless power transmitter 500 may transmit a signal having a resonant frequency of, for example, 87 kHz to 205 kHz, 277 kHz to 357 kHz, or 6.78 MHz, as power, to the wireless power receiver 510.

In operation 560, the wireless power receiver 510 may transmit a control signal to the wireless power transmitter 500 during reception of power from the wireless power transmitter 500. For example, if the battery is completely charged, the wireless power receiver 510 may transmit to the wireless power transmitter 500 a control signal requesting discontinuation of the wireless power transmission. The control signal may include at least one of, for example, a control error signal, a received power signal, a charge status signal, or a power transfer complete signal.

For example, the control error signal may include a message with a header indicating a control error and a control error value. For example, if the power received from the wireless power transmitter 500 is within a selected range, the wireless power receiver 510 may set the control error value to 0 in operation 550. For example, if the received power exceeds the selected range, the wireless power receiver 510 may set the control error value to a negative value. If the received power is below the selected range, the wireless power receiver 510 may set the control error value to a positive value. The power transfer complete signal may include, for example, a power transfer stop code indicating a stop cause. For example, the power transfer stop code may be configured to indicate one of charge complete, internal fault, over-temperature, over-voltage, over-current, battery failure, reconfigure, no response, or unknown.

In operation 570, the wireless power transmitter 500 may control the amount of transmission power applied to the power transmission circuit 320 based on the received control message (for example, the control error value). The wireless power transmitter 500 may, for example, end the power transmission to the wireless power receiver 510 based on the received control message. In this case, the wireless power transmitter 500 may perform operation 520 again.

Figure 6:
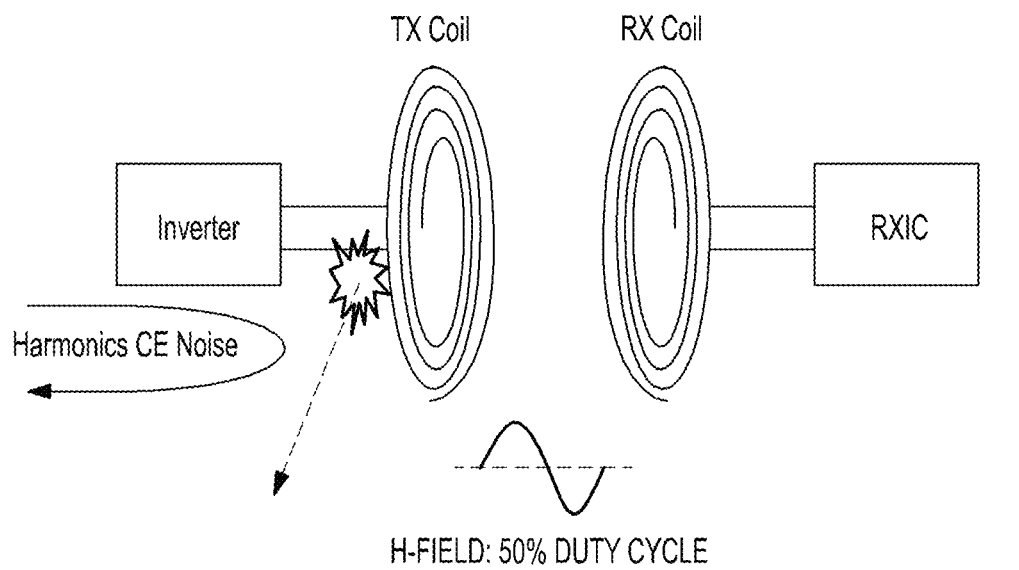
FIG. 6 is a view illustrating generation of electromagnetic interference (EMI) noise in a wireless charging system according to an embodiment of the present disclosure.
Figure 6:
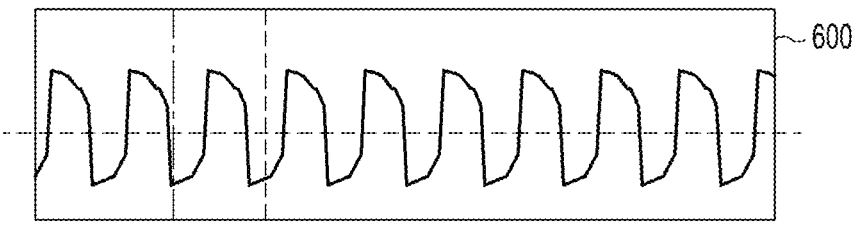
Figure 6:
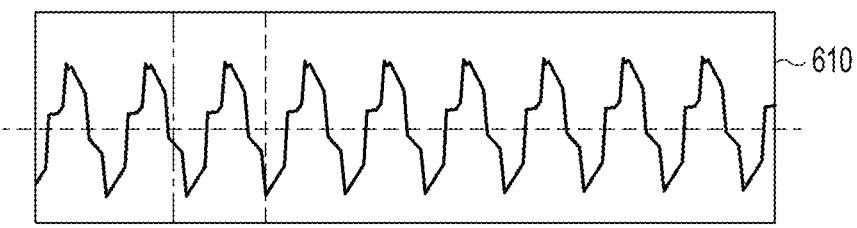

FIG. 6 is a view illustrating generation of electromagnetic interference (EMI) noise in a wireless charging system according to an embodiment of the present disclosure.

FIG. 6 is a circuit diagram of a part of a wireless power transmitter (for example, a charging pad) in a wireless charging system.

Referring to FIG. 6, if energy (for example, H-field) transmitted from a coil of the wireless power transmitter to a coil of a wireless power receiver has a duty cycle of 50%, the energy may be transmitted in a sine waveform. If the duty cycle at an inverter output end is 50%, the coil (for example, TX coil) of the wireless power transmitter may have an output waveform indicated by reference numeral 600. On the contrary, if the duty cycle at the inverter output end is not 50%, the output waveform of the coil of the wireless power transmitter may be distorted. Reference numeral 610 denotes an output waveform of the coil of the wireless power transmitter, for a duty cycle of 30%. The reason for the distortion of the sine waveform as indicated by reference numeral 610 is that harmonic reflected waves are generated, thus causing conducted emission (CE) noise.

A wireless power consortium (WPC) coil is designed so that an operating frequency is 140 kHz to 170 kHz in a constant current (CC) period during coupling, in consideration of use of a frequency of up to 190 kHz. As EMI is strictly regulated, a wireless charging system using a frequency band of 110 kHz to 190 kHz may set an available range of variable frequencies to a frequency band of 110 kHz to 148 kHz.

In a wireless power transmitter for which an upper bound frequency is limited to 148 kHz and which uses a WPC coil, if the upper bound frequency exceeds 148 kHz, power control may start through duty cycle control. However, if the duty control lowers the duty cycle to or below 50% during the power control, the EMI noise levels of radiation emission (RE) and CE may be increased. Due to the increased EMI noise levels, a limit set by a power control standard may be exceeded. Accordingly, it is necessary to consider a method for satisfying the limit set by the standard, while preventing an EMI-incurring situation.

Figure 7:
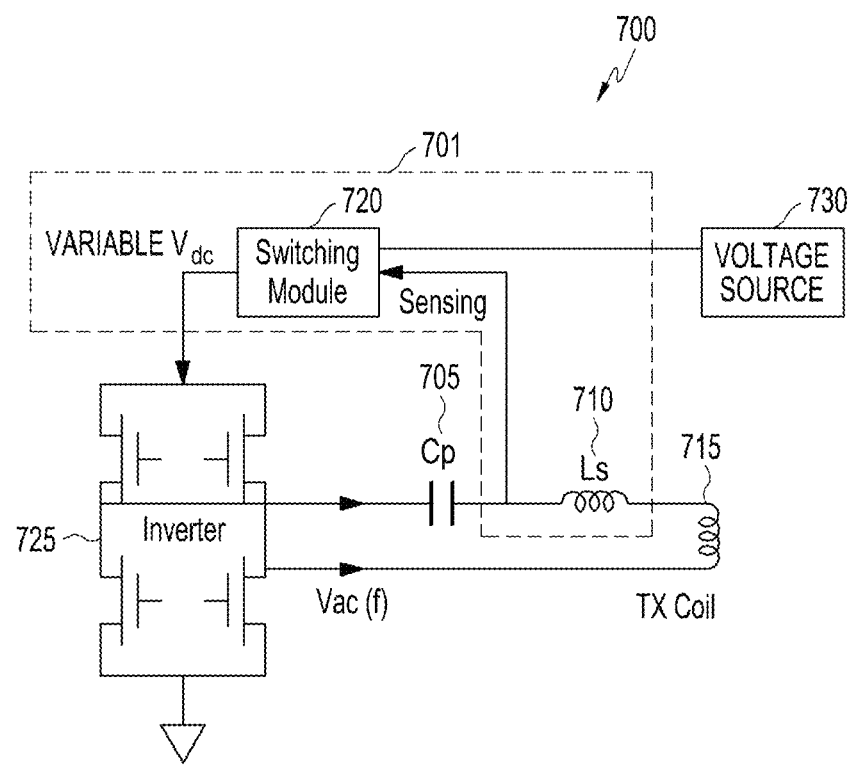
FIG. 7 is a circuit diagram illustrating a part of a wireless power transmitter according to various embodiments of the present disclosure.

Now, a detailed description will be given of an output circuit structure of a wireless power transmitter, which may prevent generation of an EMI noise source, while maintaining a duty cycle of 50% according to various embodiments of the present disclosure. The output circuit structure of a wireless power transmitter according to various embodiments of the present disclosure may additionally have an inductor and a switching module in order to increase a variation width of transmission power, while controlling a frequency within an available variable frequency range set by a standard. With reference to FIG. 7, the output circuit structure will be described in detail.

FIG. 7 is a circuit diagram illustrating a part of a wireless power transmitter according to various embodiments of the present disclosure.

Referring to FIG. 7, the configuration of a wireless power transmitter 700 may correspond to the detailed configuration of the wireless power transmission apparatus 300 illustrated in FIG. 3. The wireless power transmitter of FIG. 7, which is an electronic device capable of charging a wireless power receiver such as a smartphone, may be configured as a charging pad, a stand-type wireless charger, a tray design wireless charger, or the like.

According to various embodiments of the present disclosure, the wireless power transmitter 700 illustrated in FIG. 7 may have a structure 701 in which an inductor (for example, lumped inductor) 710 and a switching module 720 are added to increase the variation width of transmission power, while controlling a frequency within an available variable frequency range set by a standard, with a duty cycle kept at 50%. According to an embodiment, the switching module 720 electrically connected between the power transmission circuit 320 and a voltage source may be configured within the control circuit 312.

According to an embodiment, some component (for example, the power transmission circuit 320) of the wireless power transmitter may be configured to be electrically connected to a coil (for example, an inductive coil) 715 and transmit power wirelessly to the outside of the housing through the coil 715. The inductor Ls 710 may be configured as a lumped inductor to transmit power in a predetermined frequency. The switching module 720 is connected between the inductor Ls 710 and a voltage source 730, and may adjust the level of a voltage from the voltage source 730. The switching module 720 may be controlled by a controller (for example, the control circuit 312 or a processor), and the controller may be electrically connected between the components of FIG. 7 and the voltage source 730. While the controller is not shown in FIG. 7, it may be understood that each component of FIG. 7 is controlled by the controller as is the case with FIG. 3.

According to an embodiment, as illustrated in FIG. 7, some component (for example, the power transmission circuit 320) of the wireless power transmitter 700 may include an inverter 725 having one end connected to a capacitor Cp 705 and the other end connected to the coil (for example, inductive coil) 715, the capacitor Cp 705 having one end connected to the inverter 725 and the other end connected to the inductor Ls 710, the inductor Ls 710 having one end connected to the other end of the capacitor Cp 705 and the other end connected to a conductive coil (for example, the TX coil 715), and the switching module 720 having one end connected between the capacitor Cp 705 and the inductor Ls 710 and the other end connected to the inverter 725. According to an embodiment, the switching module 720 may include a DC-to-DC converter. According to an embodiment, the wireless power transmitter 700 may include at least one coil being a conductive pattern (for example, inductive coil) (TX coil) 715. According to an embodiment, although the controller may change power to be radiated through the coil 715 by adjusting the duty cycle of a signal and/or electromagnetic waves to be radiated through the coil 715, this operation may be performed under control of a power transmission circuit (for example, the power transmission circuit 320).

According to an embodiment, a control circuit (for example, the control circuit 312) may determine power to be radiated through a conductive coil (for example, the TX coil 715), adjust the level of a voltage from the voltage source 730 according to the power to be radiated, and determine the frequency of a signal and/or electromagnetic waves to be radiated through the conductive coil.

For example, when changing the power to be radiated from a first power level to a second power level less than the first power level, the control circuit may decrease the voltage level of the voltage source and set the frequency to or below a first threshold (for example, 148 kHz). Further, when changing the power to be radiated from a third power level to a fourth power level greater than the third power level, the control circuit may increase the voltage level of the voltage source and set the frequency to or below the first threshold. The control circuit may also transmit power in a frequency less than the third power level. In FIG. 7, the switching module 720 may supply a DC input voltage $V_{dc}$ to the inverter 725, and the inverter 725 may switch to an operating frequency f in response to the voltage received from the switching module 720 and transmit power Vac(f) to a reception (RX) coil (for example, the conductive pattern 476) through the TX coil 715. The inverter 725 may invert the power $V_{dc}$ of the DC waveform output from the switching module 720 to the AC waveform Vac(f) and output the AC waveform Vac(f).

A device corresponding to an inductive coil for causing resonance in the operating frequency f may be selected as the capacitor Cp 705.

The switching module 720 may perform conversion so that the voltage of power input to the inverter 725 may be a specific voltage. The switching module 720 may supply the controlled power voltage Vac to the inverter 725 under the control of the controller (for example, the control circuit 312) so that power to be radiated through the coil (for example, inductive coil) 715 may be changed.

According to various embodiments of the present disclosure, the switching module 720 may adjust the voltage level of power received from the voltage source 730 based on the result of monitoring (or sensing) the frequency (transmission frequency or output frequency) of a signal and/or electromagnetic waves to be radiated through the coil (for example, inductive coil) 715.

According to an embodiment, while sensing is performed between the inductor Ls 710 and the capacitor Cp 705 in FIG. 7, by way of example, sensing may be performed between both ends (that is, input and output ends) of the inductor Ls 710.

According to an embodiment, although the switching module 720 may adjust a power level based on a sensing result, it may be configured that after a transmission frequency is predetermined, power is transmitted based on the transmission frequency. For example, when changing the voltage V1 of input power to V2, the switching module 720 may adjust the power level based on the sensing result or the predetermined transmission frequency. V2 is a voltage adjusted based on at least a part of a monitored frequency, and may be set according to the range of the monitored frequency.

During transmission frequency adjustment, for example, the control circuit (for example, the control circuit 312) may decrease a power level from the first power level to the second power level less than the first power level, and then determine whether the transmission frequency is less than a minimum threshold by monitoring the transmission frequency. If the transmission frequency is less than the minimum threshold during the monitoring, the control circuit may increase the decreased power level again.

According to an embodiment, power of the voltage source 730 input to the switching module 720 may correspond to power input to the power adapter 321 of FIG. 3. Therefore, the voltage source 730 may output DC power having a preset voltage value for the input of AC or DC power from the outside or a power signal from a battery device. The voltage value of the DC power output from the voltage source 730 may be controlled by the controller (for example, the control circuit 312), and the DC power output from the voltage source 730 may be output to the switching module 720.

As described above, since the switching module 720 functions to convert power so that the power at its output end may have a specific voltage, for example, a DC-to-DC converter may correspond to the switching module 720.

The inductor Ls 710, which may be configured as a lumped inductor, is a device for extending a transmission power range per a frequency variation by changing the inclination of a power gain curve. Although the inductor Ls 710 increases the inductance of an inductive coil, the inductor Ls 710 may down-shift an operating frequency in which the same power is transmitted, since the same coupling coefficient k is maintained between the TX coil 715 and the RX coil (for example, the conductive pattern 476). This will be described in detail with reference to FIG. 8.

According to various embodiments, an electronic device may include a housing, a coil (for example, the conductive pattern 324 or the coil 715), a power transmission unit (for example, the power transmission circuit 320) configured to wirelessly transmit power to the outside of the housing through the coil, a switching module (for example, the switching module 720) for adjusting a level of a voltage from a voltage source, and a controller electrically connected between the power transmission unit and the voltage source. The controller may be configured to monitor a transmission frequency of a signal to be radiated through the coil, and adjust the level of the voltage from the voltage source by controlling the switching module based on a result of the monitoring.

According to various embodiments, when the level of the voltage is adjusted, the transmission frequency may be adjusted in correspondence with the adjustment of the level of the voltage.

According to various embodiments, the controller may be configured to determine whether the transmission frequency is greater than or equal to a first threshold, and if the transmission frequency is greater than or equal to the first threshold, decrease the level of the voltage by controlling the switching module.

According to various embodiments, when the power level is decreased, the transmission frequency may be configured to be decreased.

According to various embodiments, after the level of the voltage is adjusted to be decrease, the controller may be configured to determine whether the transmission frequency is less than a minimum threshold, and if the transmission frequency is less than the minimum threshold, increase the decreased power level by controlling the switching module.

According to various embodiments, the first threshold may be a value between 140 kHz and 150 kHz.

According to various embodiments, the controller may be configured to determine whether the transmission frequency is less than a minimum threshold, and increase the power level, if the transmission frequency is less than the minimum threshold.

According to various embodiments, the switching module may be a DC-to-DC converter for adjusting the level of the voltage from the voltage source and outputting the voltage at the adjusted level.

According to various embodiments, the electronic device may further include a lumped inductor.

According to various embodiments, the electronic device may further include a capacitor having one end connected to an inverter for inverting power of a DC waveform to power of an AC waveform, and the other end connected to the lumped inductor.

According to various embodiments, the switching module may have one end connected between the capacitor and the lumped inductor, and the other end connected to the inverter, and may output a voltage level adjusted based on the monitored result to the inverter.

According to various embodiments, the control circuit and/or the power transmission circuit may be configured to change the power to be radiated through the coil by performing at least one operation, and the at least one operation may include adjusting a duty cycle of the signal and/or the electromagnetic waves radiated through the coil.

Figure 8:
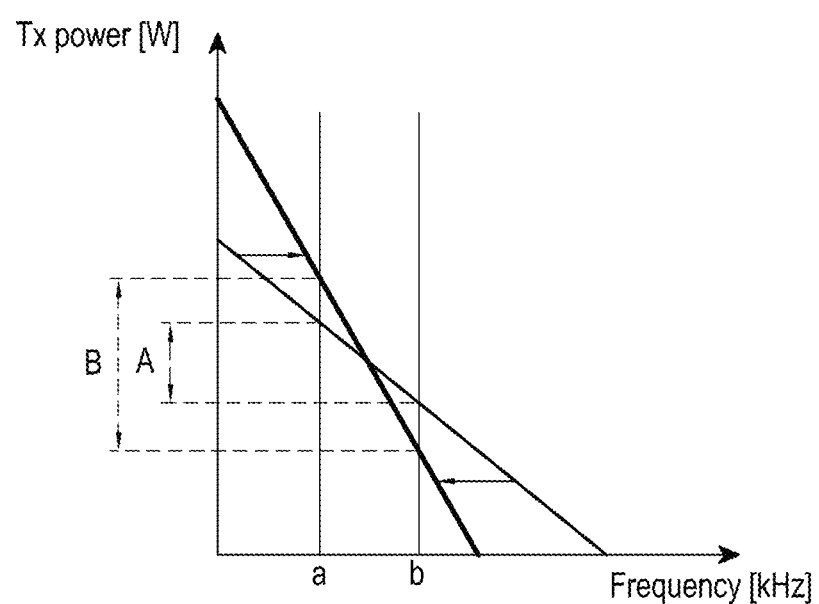
FIG. 8 is a graph illustrating a variation in a curve of power gains of a wireless power transmitter with respect to operation frequencies, arising from addition of an inductor according to various embodiments of the present disclosure.

FIG. 8 is a graph illustrating a variation in a curve of power gains of a wireless power transmitter with respect to operation frequencies, arising from addition of an inductor according to various embodiments of the present disclosure.

Referring to FIG. 8, as an inductor (for example, the inductor Ls 710) is added to a power transmission circuit (for example, the power transmission circuit 320) of a wireless power transmitter (for example, the wireless power transmission apparatus 300) according to various embodiments of the present disclosure, the curve of TX power gains of the wireless power transmitter with respect to operating frequencies may be changed. For example, let a power difference corresponding to the difference between operating frequency a and operating frequency b ($\Delta f=b-a$) be denoted by A. Then, if the inductor Ls 710 is added, the power difference A is changed to B. Therefore, the addition of the inductor Ls 710 may increase the variation width of transmission power from A to B, and increase the inclination of the curve of power gains with respect to operating frequencies in the wireless power transmitter.

The case of FIG. 8 will be described in greater detail with reference to FIGS. 9A and 9B.

Figure 9A:
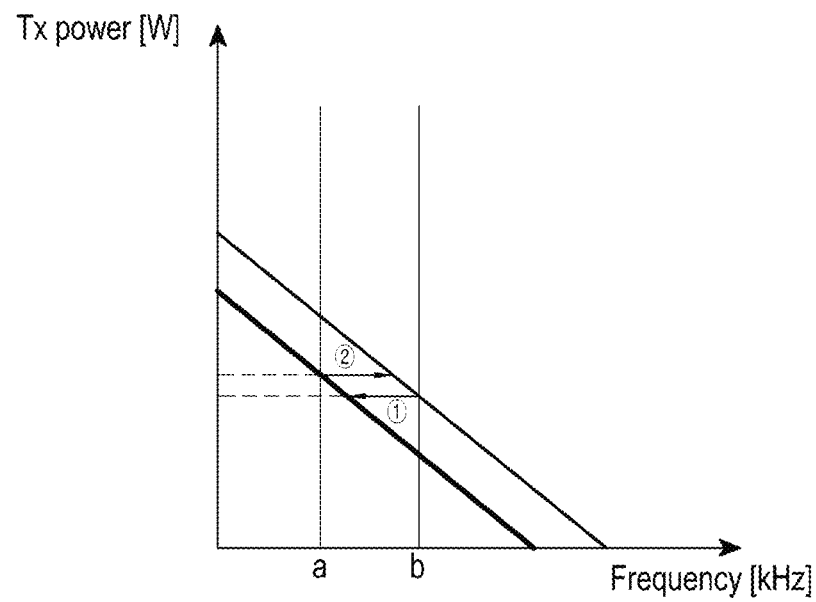
FIGS. 9A and 9B are graphs illustrating variations in curves of power gains of a wireless power transmitter with respect to operation frequencies, arising from addition of a switching module according to various embodiments of the present disclosure.
Figure 9B:
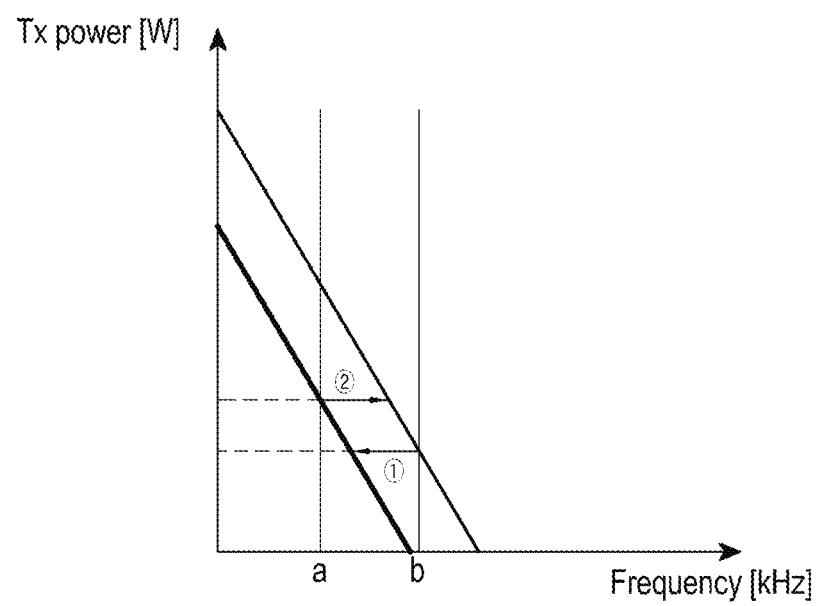

FIGS. 9A and 9B are graphs illustrating variations in curves of power gains of a wireless power transmitter with respect to operation frequencies, arising from addition of a switching module according to various embodiments of the present disclosure.

Referring to FIGS. 9A and 9B, a change of a curve of TX power gains of a wireless power transmitter (for example, the wireless power transmission apparatus 300) with respect to operating frequencies, before addition of an inductor (for example, the inductor Ls 710) is illustrated in FIG. 9A. A change of a curve of TX power gains of the wireless power transmitter with respect to operating frequencies, after addition of the inductor Ls 710 is illustrated in FIG. 9B.

Compared to a power difference corresponding to the difference ($\Delta f=b-a$) between operating frequency a and operating frequency b as illustrated in FIG. 9A, the inclination of the operating frequency versus power gain curve increases due to the addition of the inductor Ls 710 as illustrated in FIG. 9B. Therefore, the power difference corresponding to the difference ($\Delta f=b-a$) between operating frequency a and operating frequency b also increases, as illustrated in FIG. 9B. According to various embodiments of the present disclosure, the wireless power transmitter may repeat an operation of adjusting an operating frequency within an available range, for example, between a and b in real time. According to an embodiment, the available range of operating frequencies may correspond to a frequency band ranging from 110 kHz to 148 kHz, which may vary according to the inductor Ls.

As illustrated in FIGS. 9A and 9B, the wireless power transmitter repeats transition indicated by reference numeral ① and return indicated by reference numeral ② within an available operating frequency range. As noted from FIG. 9B, if the inductor Ls 710 is added according to various embodiments of the present disclosure, the power difference corresponding to the difference ($\Delta f=b-a$) between operating frequency a and operating frequency b is much larger than in FIG. 9A.

According to various embodiments of the present disclosure, as an inductor Ls is applied to a power transmission circuit of a wireless power transmitter, the width of transmission power per frequency variation $\Delta f$ is increased. As a consequence, guaranteed power may be transmitted through the switching module 720 even in a light or heavy load situation.

Figure 10A:
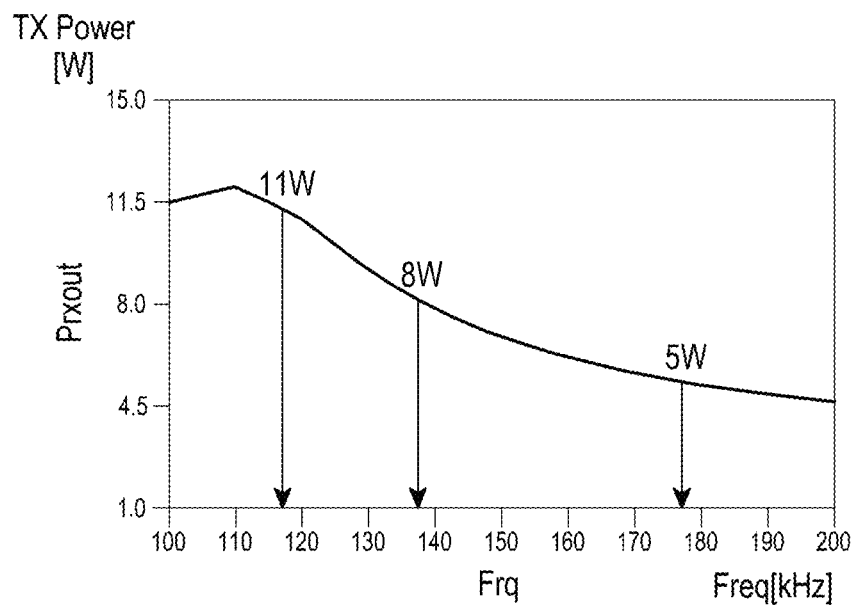
FIGS. 10A, 10B, and 10C are graphs comparing simulation results of a curve of power gains of a wireless power transmitter with respect to operation frequencies, arising from addition of an inductor according to various embodiments of the present disclosure.
Figure 10B:
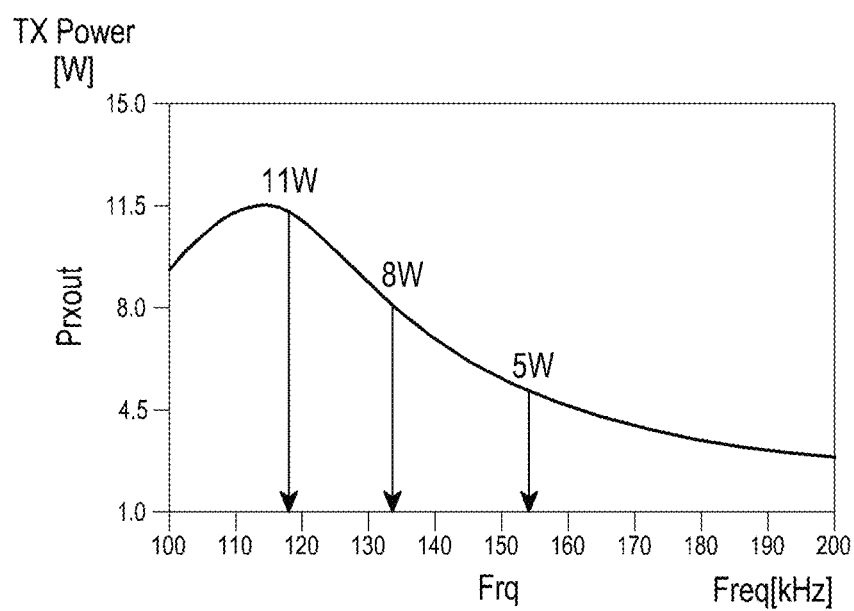
Figure 10C:
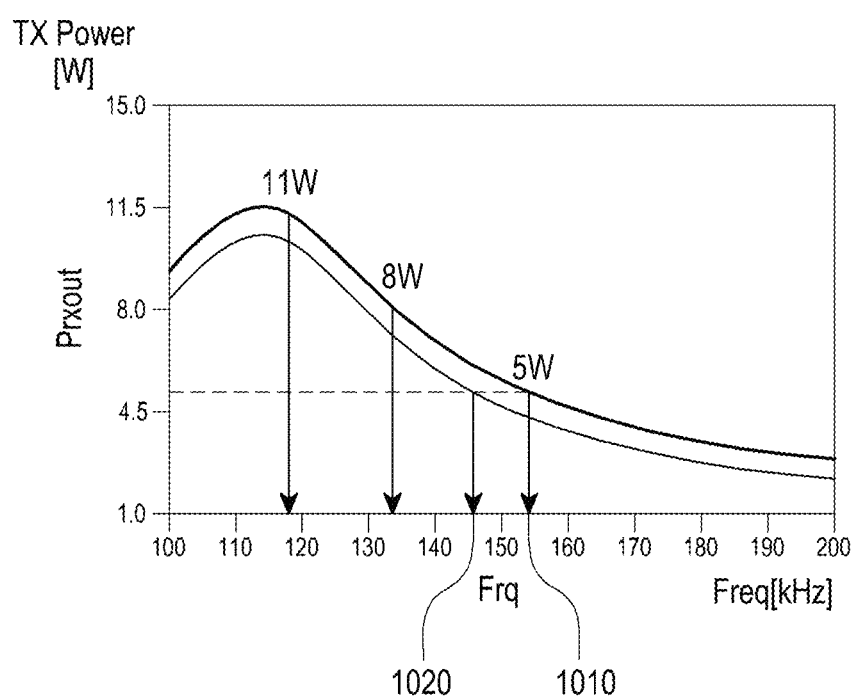

FIGS. 10A, 10B, and 10C are graphs comparing simulation results of a curve of power gains of a wireless power transmitter with respect to operation frequencies, arising from addition of an inductor according to various embodiments of the present disclosure.

Referring to FIGS. 10A and 10B, a result of simulating variations in a power gain with respect to operating frequencies in a wireless power transmitter, before an inductor (for example, the inductor Ls 710) is added to the wireless power transmitter is illustrated in FIG. 10A. A result of simulating variations in a power gain with respect to operating frequencies in a wireless power transmitter, when an inductor (for example, the inductor Ls 710) is added to the wireless power transmitter is illustrated in FIG. 10B.

Referring to FIG. 10A, power control is performed so that when transmission power of 11 W is output in a frequency band ranging from 110 kHz to 190 kHz, for example, in around 118 kHz, transmission power of 5 W is output in around 178 kHz.

Referring to FIG. 10B, it may be noted that the same transmission powers as in FIG. 10A, for example, 11 W and 5 W are output in the respective operating frequencies of about 118 kHz and 152 kHz. According to various embodiments of the present disclosure, if the inductor Ls 710 is added, transmission power may be controlled even though an available range of operating frequencies is decreased from a range of 110 kHz to 190 kHz to a range of 110 kHz to 148 kHz.

According to various embodiments of the present disclosure, if the upper bound frequency (for example, threshold) of an available operating frequency range (or threshold range) is 148 kHz in FIG. 10B, duty cycle control may start when the upper bound frequency 148 kHz is exceeded. If the available operating frequency range is increased, a situation requiring duty cycle adjustment may occur frequently as illustrated in FIG. 10A. However, according to various embodiments of the present disclosure, as the available operating frequency range for power control becomes narrow as illustrated in FIG. 10B, it may be possible to maintain the duty cycle at, for example, 50%.

Referring to FIG. 10C, a case in which an operating frequency range is changed when a power level gets low. For example, in the case where an operating frequency 1010 exceeding an upper bound frequency 1020 (for example, 148 kHz) is sensed during output of transmission power of, for example, 5 W, if a power level is lowered, an operating frequency is also decreased. Therefore, the sensed operating frequency may be within the available range that does not exceed the upper bound frequency 1020 (for example, 148 kHz). Accordingly, the same power of 5 W may be transmitted by lowering the power level. According to various embodiments of the present disclosure, if the operating frequency is decreased, for example, from 148 kHz to 118 kHz, the power level is increased. However, if the operating frequency is less than a minimum threshold (for example, 118 kHz), the power level is further decreased. If an operating frequency less than the minimum threshold is monitored, power transmission within the available operating frequency range may be possible only when the power level is increased again.

According to various embodiments of the present disclosure, an EMI noise-incurring situation may be prevented by monitoring a frequency. For example, if the wireless power transmitter outputs a frequency of 148 kHz or lower by monitoring the frequency to prevent a voltage from the voltage source from making the upper bound frequency 1020 exceed 148 kHz, the EMI noise of a specific frequency band may be reduced.

According to various embodiments of the present disclosure, desired power may be transmitted without changing the duty cycle of a frequency by controlling a power voltage of a voltage source. For example, noise of CE may be reduced by lowering the power of the voltage source without changing the duty cycle, which will be described later with reference to FIGS. 15A and 15B.

While 148 kHz is given as a reference value by which to determine whether an operating frequency is greater than or equal to an upper bound frequency 1020 (for example, a first threshold), by way of example, the first threshold may be, but not limited to, a value between 140 kHz and 150 kHz. For example, the first threshold may be any of various values, for example, between 130 kHz and 170 kHz, between 140 kHz and 160 kHz, or between 145 kHz and 155 kHz.

However, although it may occur that the duty cycle should be adjusted upon completion of charging, a power control method for adjusting the level of power from the voltage source 730 by monitoring an operating frequency, which is performed during charging will be described in greater detail. A description of a charging completion time or a secondary full charged time, at which duty cycle adjustment is required, will not be provided.

Figure 11A:
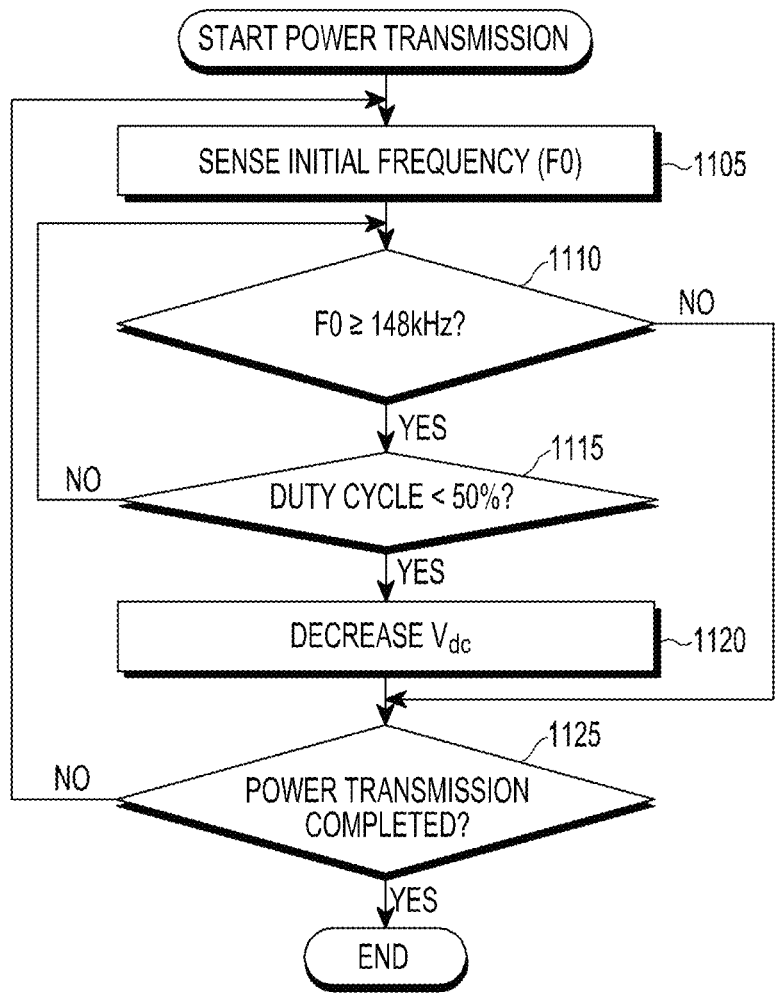
FIG. 11A is a flowchart illustrating an operation of a wireless power transmitter for adjusting transmission power, when wireless charging starts according to various embodiments of the present disclosure.

FIG. 11A is a flowchart illustrating an operation of a wireless power transmitter for adjusting transmission power, when wireless charging starts according to various embodiments of the present disclosure.

Referring to FIG. 11A, once power transmission starts, a controller (for example, the control circuit 312) of a wireless power transmitter (for example, the wireless power transmission apparatus 300) may monitor the frequency (transmission frequency, operating frequency, or output frequency) of a signal and/or electromagnetic waves to be radiated through a coil (for example, the conductive pattern 324) of a power transmission circuit (for example, the power transmission circuit 320). For example, the controller may monitor an initial operating frequency (hereinafter, referred to as an initial frequency (for example, fo), an operating frequency after transition (hereinafter, referred to as a transition frequency (for example, ft), a returned operating frequency (hereinafter, referred to as a return frequency (for example, fr), and so on.

The controller may change power to be radiated through the coil by adjusting the duty cycle of the signal and/or electromagnetic waves to be radiated through the coil (for example, the conductive pattern 324) based on the monitoring result. Further, the operation of adjusting the duty cycle of a signal and/or electromagnetic waves to be radiated through the coil may be performed by the controller and/or the power transmission unit.

This operation will be described in detail with reference to FIG. 11A. Referring to FIG. 11A, if power transmission starts, the controller may sense an initial frequency fo and then monitor the frequency of a signal and/or electromagnetic waves to be radiated through the coil (for example, the conductive pattern 324) in operation 1105. In operation 1110, the controller may determine whether the initial frequency fo reaches or exceeds a threshold frequency, for example, 148 kHz. If the initial frequency fo has not reached the threshold frequency, the controller may determine whether the power transmission has been completed in operation 1125. If the power transmission has been completed, the controller ends the power transmission procedure. On the other hand, if the power transmission is still in progress, the controller may return to operation 1105 and repeat the above-described operations.

On the contrary, if the initial frequency fo reaches or exceeds the threshold frequency, for example, 148 kHz, the controller may determine whether the duty cycle is less than 50% in operation 1115. If the duty cycle is less than 50%, which means that the charging is still in progress, the controller may monitor the frequency of the signal and/or electromagnetic waves to be radiated through the coil (for example, the conductive pattern 324), and control the switching module 720 to adjust the level of power from the voltage source based on at least a part of the monitored frequency.

According to various embodiments, the controller may sense an operating frequency through the switching module 720, and control the voltage $V_{dc}$ of power to be output to an inverter (for example, the inverter 725) based on the sensed value. As the controller controls the voltage $V_{dc}$ of power to be output to the inverter (for example, the inverter 725) in this manner, the controller may adjust transmission power in an operating frequency less than the threshold frequency (or upper bound frequency) (for example, 148 kHz), and may adjust the transmission power in real time to maintain the duty cycle at 50% all the time. That is, the controller may sense an initial operating frequency and control the voltage $V_{dc}$ of power to be output to the inverter (for example, the inverter 725) under the condition that the sensed operating frequency is less than the threshold frequency (for example, 148 kHz) and the duty cycle is less than 50%.

The controller may down-shift the voltage $V_{dc}$ by controlling the switching module 720 based on the monitoring result in operation 1120. As far as the power transmission is still in progress in operation 1125, the controller may repeat the operation of decreasing a transmission power level by down-shifting the voltage $V_{dc}$. Since an operating frequency is also adjusted in correspondence with the adjusted power level, the frequency may also be decreased during the down-shift of the voltage $V_{dc}$.

In this manner, the operation of decreasing a power level may be performed until before a frequency transitions. According to an embodiment, the controller may monitor an operating frequency to prevent a power level from being too low or to prevent the operating frequency from being outside the threshold range (for example, the available range of operating frequencies) of FIG. 10B.

After the transmission power is adjusted to be decreased by down-shifting the voltage $V_{dc}$ as described above, an operating frequency may be sensed again to thereby determine whether the operating frequency is less than the upper bound frequency (for example, 148 kHz). That is, the controller may monitor whether it operates in a frequency less than the upper bound frequency by sensing the operating frequency after adjusting the transmission power level. If the monitoring result reveals that the sensed frequency is less than the minimum threshold frequency, the transmission power is too low and as a result, charging efficiency is also decreased. Therefore, the controller should adjust the transmission power level to increase by up-shifting the voltage $V_{dc}$. Accordingly, the operation of monitoring whether a sensed frequency is greater than the minimum threshold frequency and less than the upper bound frequency (for example, 148 kHz) by sensing an operating frequency and controlling the voltage $V_{dc}$ may be performed repeatedly from the start of wireless charging until before completion of the wireless charging.

Figure 11B:
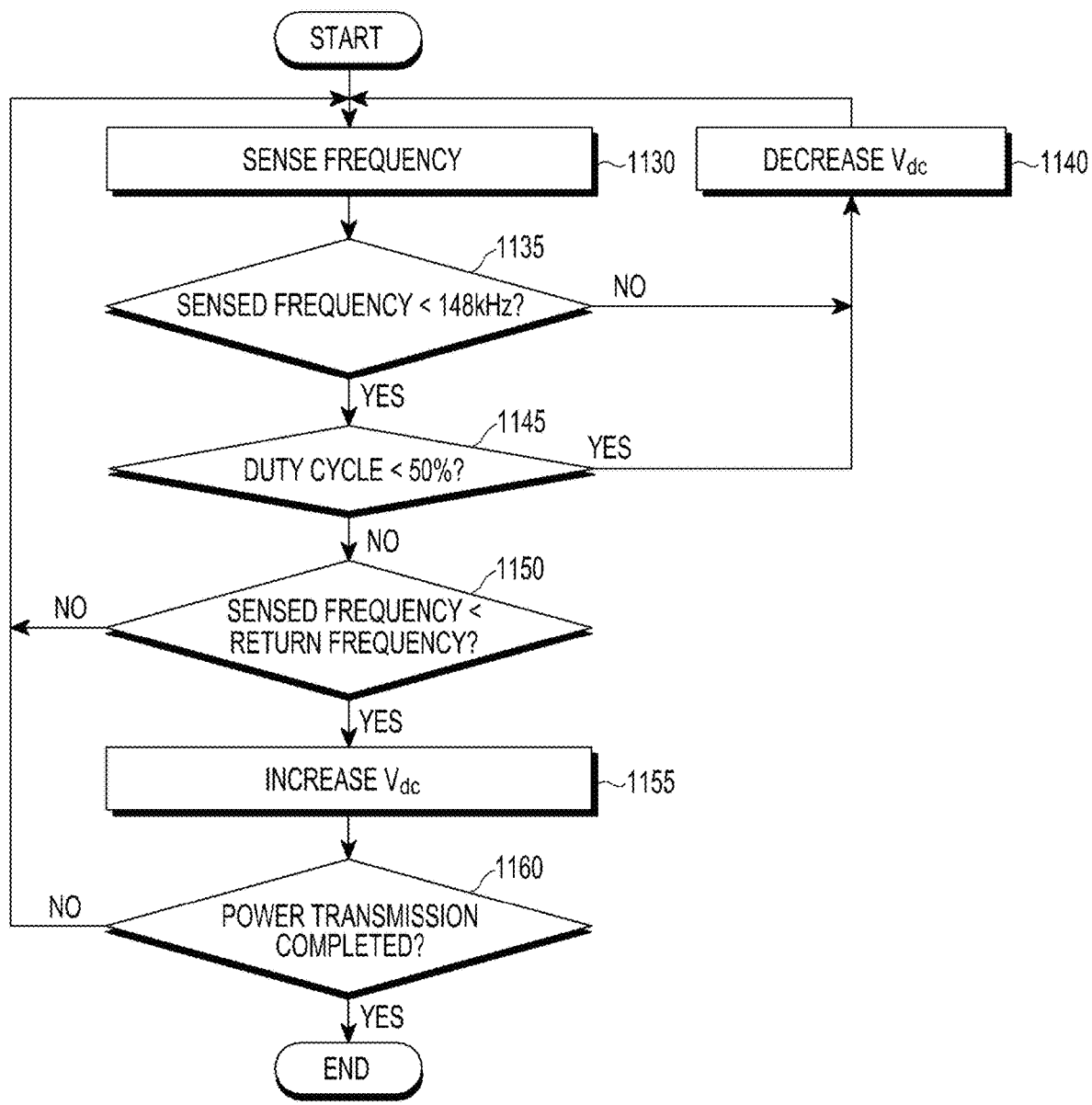
FIG. 11B is a flowchart illustrating an operation of a wireless power transmitter for adjusting transmission power according to various embodiments of the present disclosure.

FIG. 11B is a flowchart illustrating an operation of a wireless power transmitter for adjusting transmission power according to various embodiments of the present disclosure.

Referring to FIG. 11B, according to an embodiment, a controller (for example, the control circuit 312) of a wireless power transmitter (for example, the wireless power transmission apparatus 300) may sense a frequency in operation 1130. According to an embodiment, upon the start of power transmission, the frequency sensing operation may be performed, and a frequency sensed when the power transmission starts may be referred to as an initial frequency. According to an embodiment, the frequency sensing operation may be performed in the course of the power transmission, and a frequency sensed in the course of the power transmission may be referred to as an operating frequency. According to an embodiment, the frequency sensing operation may be performed simultaneously with or after down-shift of the voltage $V_{dc}$, and a frequency sensed after adjustment of the voltage $V_{dc}$ is an operating frequency and may be referred to as a transition frequency.

Therefore, the frequency sensed in operation 1130 may be any of an initial frequency, a transition frequency, and so on. For example, if the frequency sensed in operation 1130 is an initial frequency (for example, fo), a description of operations 1135 and 1145 may be identical to a description of operations 1110 and 1115 in FIG. 11A.

On the other hand, if the frequency sensed in operation 1130 is a transition frequency, the following operations may be performed. To help understanding of a description of FIG. 11B, a sensed frequency will be described in the context of a transition frequency, by way of example.

In operation 1130, the controller may determine whether the sensed frequency (for example, the transition frequency) is less than an upper bound frequency (for example, 148 kHz). If the sensed frequency is not less than the upper bound frequency, that is, if the sensed frequency exceeds the upper bound frequency in operation 1135, the controller may down-shift the voltage $V_{dc}$ so that the operating frequency may not exceed the upper bound frequency in operation 1140. Since the frequency is also adjusted along with the adjustment of the voltage $V_{dc}$, the operating frequency may be decreased by down-shifting the voltage $V_{dc}$.

On the other hand, if the sensed frequency is less than the upper bound frequency in operation 1135, the controller may determine whether a duty cycle is less than 50% in operation 1145. If the duty cycle is less than 50%, that is, the duty cycle is not 50%, the controller may down-shift the voltage $V_{dc}$ so that the duty cycle may be 50% in operation 1140.

If the duty cycle is not below 50%, for example, the duty cycle is maintained at 50% in operation 1145, the controller may determine whether the sensed frequency is less than a return frequency (or a minimum threshold frequency) in operation 1150. If the duty cycle is maintained at 50%, the sensed frequency is less than the upper bound frequency, but the controller should control the frequency not to be too low in consideration of charging efficiency. For this purpose, the controller may compare the sensed frequency with the return frequency (or the minimum threshold frequency).

If the sensed frequency is less than the return frequency, the controller may up-shift the voltage $V_{dc}$ by controlling the switching module 720 in operation 1155. That is, transmission power may be increased again by up-shifting the voltage $V_{dc}$. On the other hand, if the sensed frequency is not below the return frequency in operation 1150, for example, the controller may return to operation 1130 in order to prevent the sensed frequency from dropping to or below a frequency that satisfies a minimum power transmission standard, that is, the return frequency although the sensed frequency is less than the upper bound frequency. As far as the power transmission is still in progress in operation 1160, the controller may return to operation 1130 and repeat the above-described operations.

As described above, after power transmission starts, the wireless power transmitter may sense an operating frequency. If the operating frequency is down-shifted to or below a return frequency, the wireless power transmitter may increase transmission power by up-shifting the voltage $V_{dc}$. According to an embodiment, the controller may adjust a power level based on the result of monitoring the frequency of a signal and/or electromagnetic waves to be radiated through an inductive coil. The return frequency may be defined as a value that satisfies guaranteed power set by the WPC standard.

According to various embodiments, a wireless charging method in an electronic device may include wirelessly transmitting power through a coil, monitoring a transmission frequency of a signal to be radiated through the coil, and adjusting the transmission frequency by adjusting a power level based on a result of the monitoring.

According to various embodiments, the adjustment of the transmission frequency may include determining whether the transmission frequency is greater than or equal to a first threshold, and decreasing the power level, if the transmission frequency is greater than or equal to the first threshold. According to an embodiment, when the power level is decreased, the transmission frequency may be decreased in correspondence to the decrease of the power level.

According to various embodiments, the adjustment of the transmission frequency may include decreasing the power level from a first power level to a second power level less than the first power level, determining whether the transmission frequency is less than a minimum threshold by monitoring the transmission frequency, and increasing the decreased power level, if the transmission frequency is less than the minimum threshold.

According to various embodiments, the first threshold may be a value between 140 kHz and 150 kHz.

According to various embodiments, the adjustment of the transmission frequency may include determining whether the transmission frequency is less than a minimum threshold, and increasing the power level, if the transmission frequency is less than the minimum threshold.

According to various embodiments, the electronic device may include a switching module for adjusting a level of a voltage from a voltage source, and a lumped inductor connected to a power transmission unit configured to wirelessly transmit the power through the coil, and the adjustment of the transmission frequency may include adjusting the level of the voltage from the voltage source by controlling the switching module.

Figure 12:
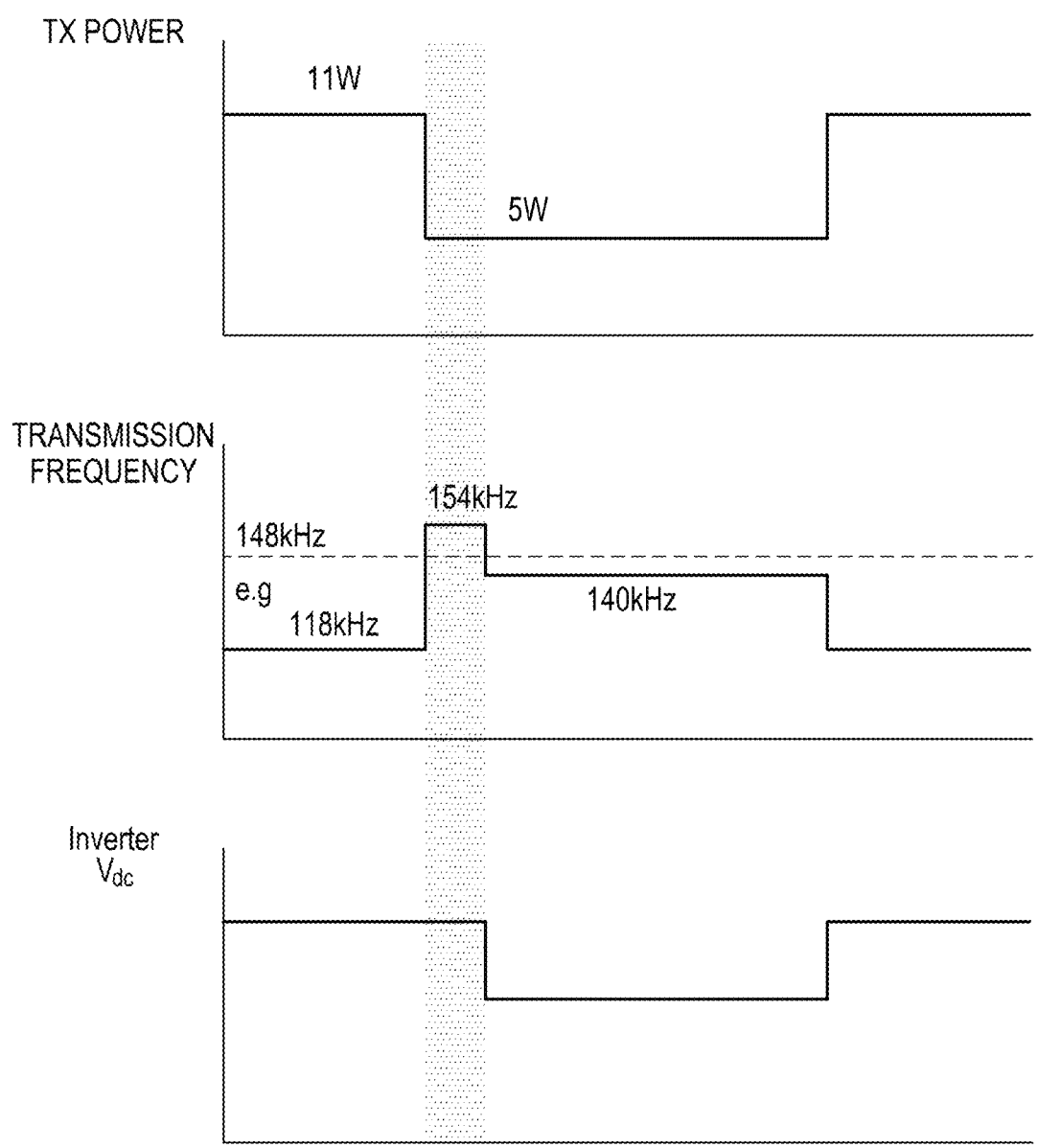
FIGS. 12, 13, and 14 are views illustrating a relationship between transmission frequencies and inverter output voltages, when high power is changed to low power according to various embodiments of the present disclosure.
Figure 13:
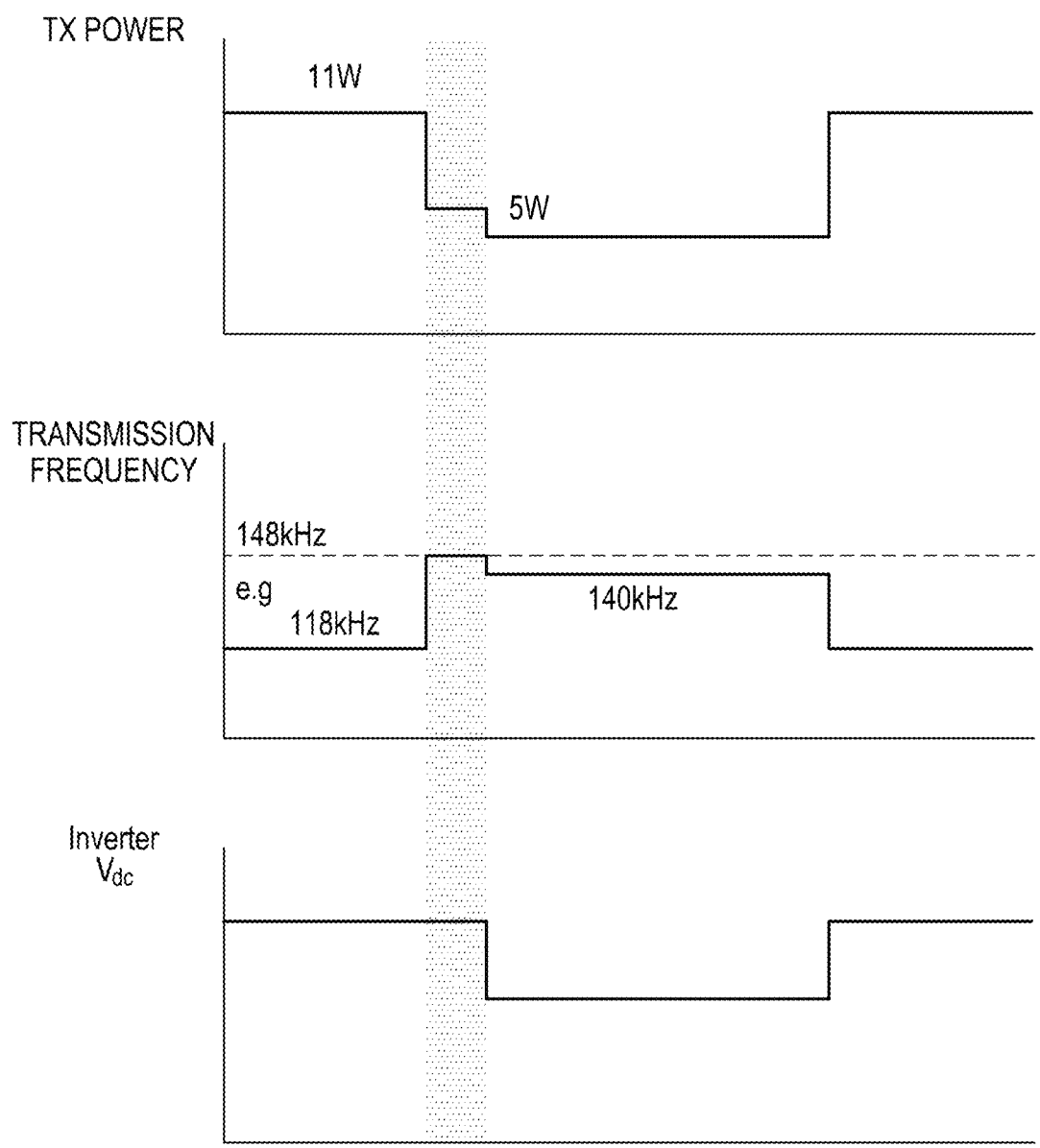
Figure 14:
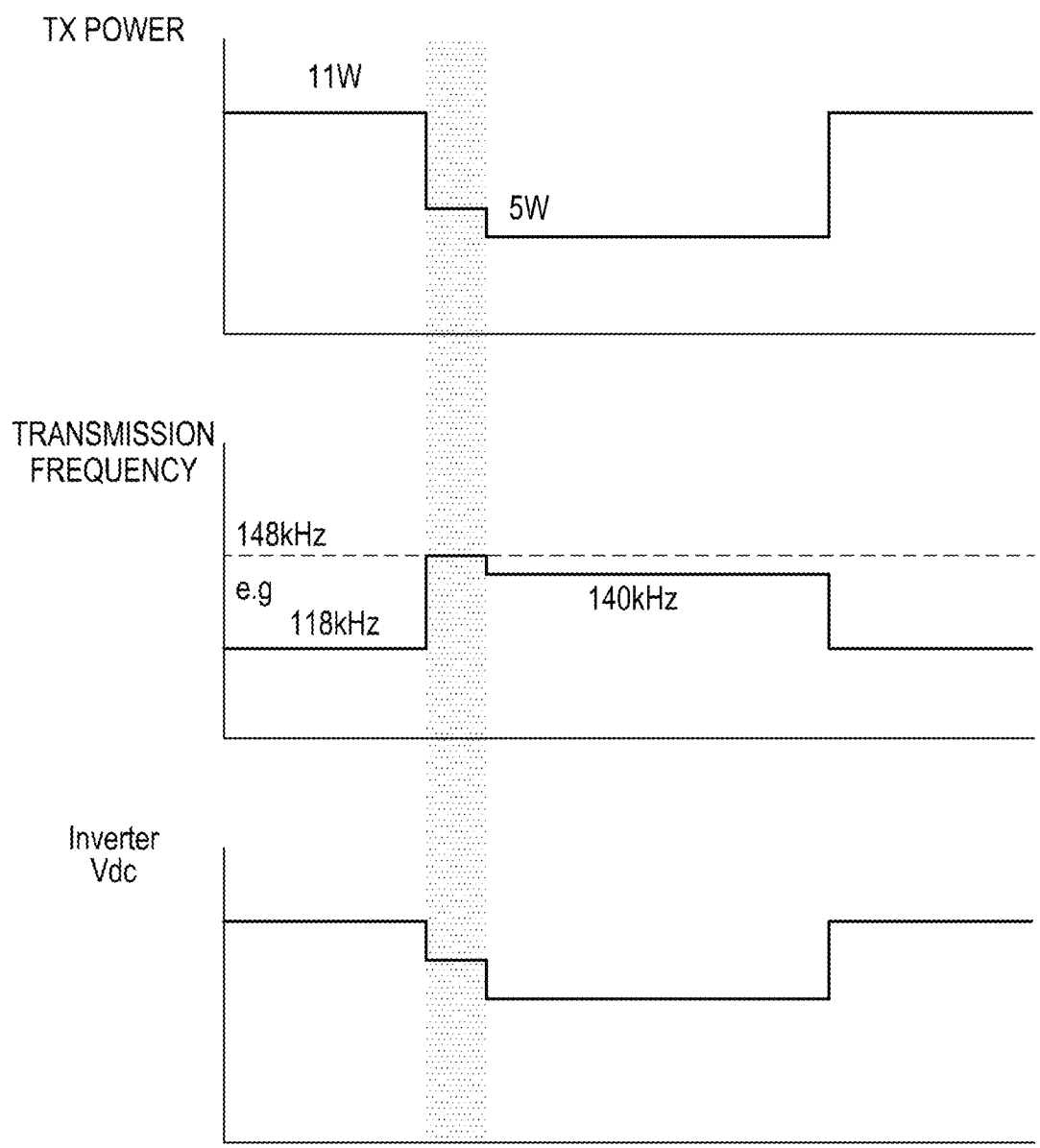

FIGS. 12, 13, and 14 are views illustrating a relationship between transmission frequencies and inverter output voltages, when high power is changed to low power according to various embodiments of the present disclosure.

Referring to FIG. 12, according to an embodiment, a controller (for example, the control circuit 312) may be configured to decrease power from a first power level (high power) to a second power level (low power) less than the first power level, monitor the frequency of a signal and/or electromagnetic waves to be radiated through an inductive coil, determine whether the frequency is greater than or equal to a first threshold (upper bound frequency, for example, 148 kHz), and decrease the level (for example, $V_{dc}$) of power from a voltage source, if the frequency is greater than or equal to the first threshold.

While the operation of changing transmission power from high power to low power has been described above with reference to FIG. 12, the following operation may be performed to change transmission power from low power to high power. According to an embodiment, the controller may be configured to increase power from a third power level (low power) to a fourth power level (high power) greater than the third power level, monitor the frequency of a signal and/or electromagnetic waves to be radiated through an inductive coil, determine whether the frequency is less than a minimum threshold, and increase the decreased level of power from the voltage source, if the frequency is less than the minimum threshold. The minimum threshold may be a reference frequency based on which minimum power requested by a wireless power receiver is transmitted. For example, it may be configured that if the wireless power transmitter transmits high power transitioned from low power to the wireless power receiver, a transmission frequency is decreased. A reference based on which transition from lower power to high power takes place may be the minimum threshold.

According to an embodiment, after adjusting the power level to be decreased, the controller may determine whether the transmission frequency is less than the minimum threshold. If the transmission frequency is less than the minimum threshold, the controller may control the decreased power level to be increased by controlling the switching module.

If the power level changing operation such as decreasing the power level (for example, $V_{dc}$) to the second power level less than the first power level is repeated, the power level may become too low. In this case, power transmission efficiency may be decreased. Accordingly, after the power level is decreased, the transmission frequency may be monitored to prevent the power level from becoming too low. The controller may determine whether the transmission frequency is less than the minimum threshold. If the transmission frequency is below the minimum threshold, the controller may increase the decreased power level to prevent the power level from being decreased further.

According to an embodiment, when the transmission frequency decreases from 140 kHz to 118 kHz, the power level is increased as illustrated in FIG. 10B. However, in the state where the transmission frequency is below the minimum threshold (for example, 118 kHz), the power level is decreased gradually. If the transmission frequency is monitored and found to be less than the minimum threshold, transmission power within an available range of transmission frequencies may be possible only by increasing the power level again. To increase the power level again, the transmission frequency may be increased to the available range (for example, a frequency equal to or greater than the minimum threshold), for power transmission.

Specifically, FIG. 12 illustrates a relationship between transmission frequencies, that is, operating frequencies and $V_{dc}$ provided to the inverter, when the wireless power transmitter transitions from high power to low power and thus outputs the low power. Referring to FIG. 12, if it occurs that the wireless power transmitter should decrease output power suddenly to low power of 5 W during output of high power of 11 W, for example, when a heat emission control situation takes place and thus temperature is to be lowered fast, an operating frequency may also be shifted fast.

For example, if the operating frequency is 118 kHz and then sensed as 154 kHz exceeding a threshold of 148 kHz, the controller may down-shift the operating frequency to 140 kHz by lowering $V_{dc}$ provided to the inverter. The controller may monitor the operating frequency simultaneously with or after power reduction, and lower $V_{dc}$ after or simultaneously with decreasing the operating frequency based on the monitoring result, thereby matching the power to 5 W.

Referring to FIG. 13, while the case of an operating frequency exceeding a threshold of 148 kHz has been described with reference to FIG. 12, FIG. 13 illustrates a case of adjusting the amount of transmission power stepwise so that an operating frequency may not exceed the threshold of 148 kHz. For example, if power should be decreased from high power of 11 W to low power of 5 W as illustrated in FIG. 13, the power may be decreased from the high power of 11 W stepwise (for example, to about 6 W) and then to the low power of 5 W. Then, the operating frequency may not exceed the threshold of 148 kHz. That is, if the operating frequency reaches the threshold of 148 kHz, the controller (for example, the control circuit 132) may control downshift of $V_{dc}$. While one operation is added to the procedure of lowering power from high power to low power in FIG. 13, by way of example, a plurality of operations may also be added.

Referring to FIG. 14 a case of adjusting $V_{dc}$ stepwise along with an operating frequency, while adjusting the amount of power stepwise in order to prevent an operating frequency from exceeding the threshold of 148 kHz is illustrated. According to an embodiment, when the controller (for example, the control circuit 312) performs power control, the controller may lower $V_{dc}$ provided to the inverter before the transmission frequency exceeds the threshold.

Figure 15A:
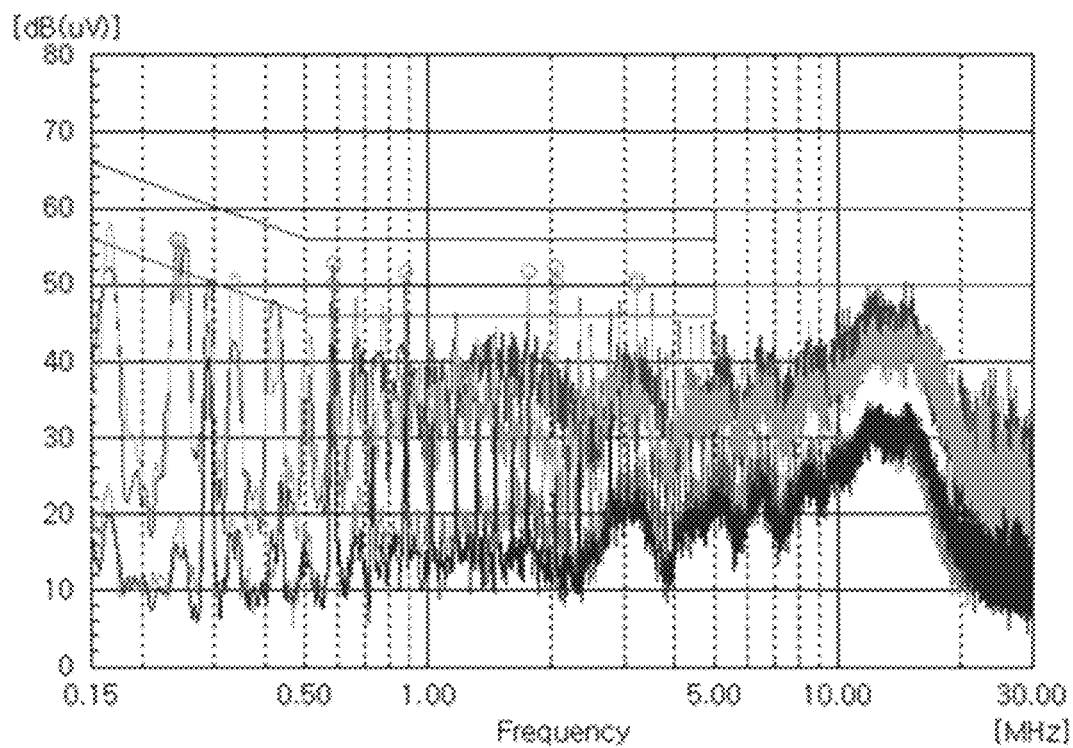
FIGS. 15A and 15B are graphs illustrating improved measurement results produced by addition of an inductor and a switching module, compared to conducted emission (CE) measurement results of the related art according to various embodiments of the present disclosure.
Figure 15B:
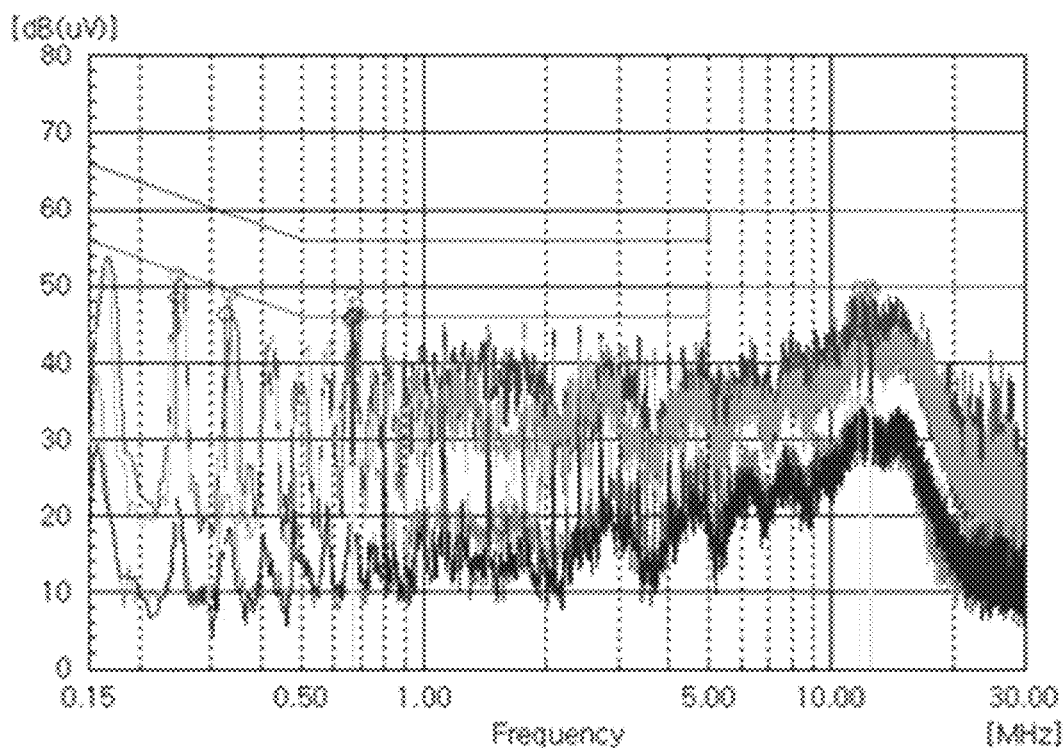

FIGS. 15A and 15B are graphs illustrating improved measurement results produced by addition of an inductor and a switching module, with respect to conducted CE measurement results of the related art according to various embodiments of the present disclosure.

FIG. 15A illustrates CE measurement results for a general wireless power transmitter, and FIG. 15B illustrates CE measurement results for a wireless power transmitter according to various embodiments of the present disclosure.

Referring to FIG. 15A, it may occur that when the wireless power transmitter decreases power for heat emission control, the wireless power transmitter starts duty control in 148 kHz, and harmonics occurs in a band of 1 to 5 Mhz, resulting in CE noise exceeding a regulated limit. In contrast, the wireless power transmitter according to various embodiments of the present disclosure may map an available range of operating frequencies to 110 to 140 kHz by applying an output circuit structure. Therefore, CE measurement results with a 10 dB error margin and a duty cycle always maintained at 50% may be achieved, as illustrated in FIG. 15B.

As is apparent from the foregoing description, according to various embodiments of the present disclosure, a wireless power transmitter may reduce EMI because the wireless power transmitter has an output circuit structure that is capable of controlling a frequency within an available range of frequencies.

According to various embodiments of the present disclosure, generation of an EMI noise source may be reduced by changing a frequency band and maintaining a duty cycle (for example, 50%) through power control in a system in which power control is performed in a legacy frequency band.

According to various embodiments of the present disclosure, since EMI may be reduced by adding simple passive devices such as a switch and an inductor, a cost increase incurred by the passive devices is prevented, compared to addition of large-volume, large-capacity devices.

The term "module" as used herein may refer to a unit including one or a combination of two or more of hardware, software, and firmware. The term "module" may be used interchangeably with terms such as, for example, unit, logic, logical block, component, or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium (for example, the storage 215 or 259), in the form of a programming module. When the commands are executed by a processor (for example, the controller 212 or 252), the processor may execute functions corresponding to the commands. The computer-readable medium may include hard disk, floppy disk, magnetic media (for example, magnetic tape), optical media (for example, compact disc read-only memory (CD-ROM)), digital versatile disc (DVD), magneto-optical media (for example, floptical disk), hardware devices (for example, ROM, random access memory (RAM) or flash memory)), and the like. Program instructions may include machine language code that are produced by a compiler or high-level language code that may be executed by a computer using an interpreter.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

According to various embodiments of the present disclosure, a storage medium may store instructions configured to, when executed by at least one processor, control the at least one processor to perform at least one operation. The at least one operation may include wirelessly transmitting power through a coil, monitoring a transmission frequency of a signal to be radiated through the coil, and adjusting the transmission frequency by adjusting a power level based on a result of the monitoring.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing;
a conductive coil;
a power transmission circuit electrically connected to the conductive coil, and configured to wirelessly transmit power to an outside of the housing through the conductive coil;
a voltage source electrically connected to the power transmission circuit;
a sensing circuit electrically connected to the conductive coil; and
a control circuit electrically connected to the power transmission circuit, the voltage source, and the sensing circuit,
wherein the control circuit is configured to:
control the power transmission circuit to transmit power through the conductive coil wirelessly,
identify a frequency of a signal based on electromagnetic waves radiated through the conductive coil using the sensing circuit when the conductive coil transmits the power, and
adjust a level of a voltage provided from the voltage source to the power transmission circuit based on the frequency of the signal and at least one threshold associated with the frequency of the signal,
wherein the sensing circuit includes an inductor which is connected between the power transmission circuit and the conductive coil,
wherein the control circuit comprises a switch electrically connected between the power transmission circuit and the voltage source,
wherein the control circuit is further configured to adjust the switch to adjust the level of the voltage provided from the voltage source to the power transmission circuit,
wherein the sensing circuit further comprises a capacitor having one end connected to an inverter for inverting power of a DC waveform to power of an alternating current (AC) waveform, and another end connected to a lumped inductor,
wherein the switch has one end connected between the capacitor and the lumped inductor, and another end connected to the inverter, and
wherein the switch is configured to output a voltage level adjusted based on a monitored result to the inverter.

2. The electronic device of claim 1, wherein the control circuit is further configured to:
identify whether the frequency is greater than or equal to a first threshold, and
decrease the level of the voltage provided from the voltage source to the power transmission circuit, if the frequency is greater than or equal to the first threshold.

3. The electronic device of claim 2, wherein the control circuit is further configured to:
identify whether the frequency is less than or equal to the first threshold, and
increase the level of the voltage provided from the voltage source to the power transmission circuit, if the frequency is less than or equal to the first threshold.

4. The electronic device of claim 1, wherein the control circuit is further configured to:
decrease the power from a first power level to a second power level less than the first power level,
identify the frequency of the signal based on the electromagnetic waves radiated through the conductive coil shortly after or substantially simultaneously with the power decrease,
identify whether the frequency is less than or equal to a first threshold, and
further decrease the power from the second power level to a third power level less than the second power level based on a determination that the frequency is less than the first threshold.

5. The electronic device of claim 1, wherein the control circuit is further configured to:
  decrease the power from a first power level to a second power level less than the first power level,
  identify the frequency of the signal based on the electromagnetic waves radiated through the conductive coil shortly after or substantially simultaneously with the power decrease,
  identify whether the frequency is greater than or equal to a first threshold,
  decrease the level of the voltage provided from the voltage source to the power transmission circuit, and
  further decrease the power from the second power level to a third power level less than the second power level.

6. The electronic device of claim 1, wherein the control circuit is configured to identify whether the frequency of the signal is greater than or equal to a first threshold.

7. The electronic device of claim 1, wherein one of the control circuit or the power transmission circuit is further configured to change the power radiated through the power transmission circuit to perform at least one of:
  adjusting a duty cycle of the signal based on the electromagnetic waves radiated through the conductive coil, or
  adjusting a duty of the signal based on the electromagnetic waves radiated through the conductive coil.

8. The electronic device of claim 1, wherein the switch is a direct current (DC) to DC converter for adjusting the level of the voltage provided from the voltage source to the power transmission circuit and outputting the voltage at the adjusted level.

9. The electronic device of claim 1,
  wherein one of the control circuit or the power transmission circuit is further configured to change the power radiated through the conductive coil by performing at least one operation, and
  wherein the at least one operation includes adjusting a duty cycle of the signal based on the electromagnetic waves radiated through the conductive coil.

10. A wireless charging method in an electronic device, the wireless charging method comprising:
  wirelessly transmitting power through a conductive coil using a power transmission circuit;
  identifying a transmission frequency of a signal radiated through the conductive coil by using a sensing circuit connected to the conductive coil when the conductive coil transmits the power; and
  adjusting the transmission frequency by adjusting a level of a voltage provided from a voltage source to the power transmission circuit based on a result of the identifying and at least one threshold associated with the transmission frequency of the signal,
  wherein the electronic device includes a switching module for adjusting the level of the voltage provided from the voltage source to the power transmission circuit, and the sensing circuit including a lumped inductor which is connected between the power transmission circuit and the conductive coil, and
  wherein the adjustment of the transmission frequency comprises adjusting the level of the voltage provided from the voltage source to the power transmission circuit by controlling the switching module.

11. The wireless charging method of claim 10, wherein the adjustment of the transmission frequency comprises:
  identifying whether the transmission frequency is greater than or equal to a first threshold; and
  decreasing the voltage level, if the transmission frequency is greater than or equal to the first threshold.

12. The wireless charging method of claim 10, wherein when the voltage level is decreased, the transmission frequency is decreased in correspondence to the decrease of the voltage level.

13. The wireless charging method of claim 10, wherein the adjustment of the transmission frequency comprises:
  decreasing the voltage level from a first voltage level to a second voltage level less than the first voltage level;
  identifying whether the transmission frequency is less than a minimum threshold by monitoring the transmission frequency; and
  increasing the decreased voltage level, if the transmission frequency is less than the minimum threshold.

14. The wireless charging method of claim 10, wherein the adjustment of the transmission frequency comprises:
  identifying whether the transmission frequency is less than a minimum threshold; and
  increasing the voltage level, if the transmission frequency is less than the minimum threshold.

* * * * *